US012777141B2

(12) United States Patent
Ishikawa

(10) Patent No.: US 12,777,141 B2
(45) Date of Patent: Oct. 27, 2026

(54) NOTIFICATION DEVICE AND NOTIFICATION SYSTEM

(71) Applicants: DENSO CORPORATION, Kariya-city (JP); TOYOTA JIDOSHA KABUSHIKI KAISHA, Toyota (JP); J-QuAD DYNAMICS Inc., Tokyo (JP)

(72) Inventor: Takahiro Ishikawa, Tokyo (JP)

(73) Assignees: DENSO CORPORATION, Kariya-city (JP); TOYOTA JIDOSHA KABUSHIKI KAISHA, Toyota (JP); J-QuAD DYNAMICS Inc., Tokyo (JP)

( * ) Notice: Subject to any disclaimer, the term of this patent is extended or adjusted under 35 U.S.C. 154(b) by 0 days.

(21) Appl. No.: 19/237,353

(22) Filed: Jun. 13, 2025

(65) Prior Publication Data

US 2025/0386002 A1 Dec. 18, 2025

(30) Foreign Application Priority Data

Jun. 14, 2024 (JP) ................................ 2024-096749

(51) Int. Cl.
*H04N 17/00* (2006.01)
*G06V 10/74* (2022.01)
(Continued)

(52) U.S. Cl.
CPC ......... *H04N 17/002* (2013.01); *G06V 10/761* (2022.01); *G06V 10/993* (2022.01); *G06V 20/59* (2022.01); *G06V 2201/07* (2022.01)

(58) Field of Classification Search
CPC .................................................... H04N 17/002
See application file for complete search history.

(56) References Cited

U.S. PATENT DOCUMENTS 12,425,721 B1 * 9/2025 Bocamazo ............. H04N 23/67
2018/0314907 A1 11/2018 Ikeda et al.
(Continued)

FOREIGN PATENT DOCUMENTS

JP 2018-071994 A 5/2018
JP 2018-142828 A 9/2018
(Continued)

*Primary Examiner* — Y Lee
(74) *Attorney, Agent, or Firm* — Precision Patents, P.C.

(57) ABSTRACT

A notification device includes an image acquisition unit that acquires images, a steady-state determination unit that determines whether a non-temporary malfunction state occurs in the camera system, a memory processing unit that stores malfunction information in a storage area, a start-up determination unit that determines whether the non-temporary malfunction state exists during the period until the steady-state determination unit is able to determine the occurrence of the non-temporary malfunction state, and an alarm output process processing unit that outputs an alarm when each determination unit determines that the non-temporary malfunction state exists. The start-up determination unit includes a previous information acquisition unit that acquires the malfunction information stored in the storage area when the control unit of the vehicle was turned off from a previous power-on state, and a provisional determination unit that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

8 Claims, 17 Drawing Sheets

(51) Int. Cl.

*G06V 10/98* (2022.01)

*G06V 20/59* (2022.01)

(56) References Cited

U.S. PATENT DOCUMENTS

| | | | |
|---|---|---|---|
| 2020/0210740 | A1 | 7/2020 | Ikeda et al. |
| 2020/0210747 | A1 | 7/2020 | Ikeda et al. |
| 2020/0210750 | A1 | 7/2020 | Ikeda et al. |
| 2020/0211171 | A1 | 7/2020 | Ikeda et al. |
| 2020/0211194 | A1 | 7/2020 | Ikeda et al. |
| 2020/0211195 | A1 | 7/2020 | Ikeda et al. |
| 2020/0219222 | A1 | 7/2020 | Ikeda et al. |
| 2020/0219280 | A1 | 7/2020 | Ikeda et al. |
| 2021/0088441 | A1 | 3/2021 | Oki et al. |
| 2021/0088456 | A1 | 3/2021 | Asayama et al. |
| 2021/0089802 | A1 | 3/2021 | Ikeda et al. |
| 2021/0089809 | A1 | 3/2021 | Asayama et al. |
| 2021/0089818 | A1 | 3/2021 | Asayama et al. |
| 2021/0090236 | A1 | 3/2021 | Asayama et al. |
| 2021/0090237 | A1 | 3/2021 | Asayama et al. |
| 2021/0090262 | A1 | 3/2021 | Kono et al. |
| 2021/0090268 | A1 | 3/2021 | Ikeda et al. |
| 2021/0090297 | A1 | 3/2021 | Yamamoto et al. |
| 2024/0153141 | A1* | 5/2024 | Qiu ........................... G06T 7/80 |
| 2025/0386002 | A1* | 12/2025 | Ishikawa .............. H04N 17/002 |

FOREIGN PATENT DOCUMENTS

| | | | |
|---|---|---|---|
| JP | 2018-191087 | A | 11/2018 |
| JP | 2019-106641 | A | 6/2019 |
| JP | 2019-106643 | A | 6/2019 |
| JP | 2019-106644 | A | 6/2019 |
| JP | 2019-128197 | A | 8/2019 |
| JP | 2019-128797 | A | 8/2019 |
| JP | 2019-128798 | A | 8/2019 |
| JP | 2019-133333 | A | 8/2019 |
| JP | 2020-106484 | A | 7/2020 |
| JP | 2020-107232 | A | 7/2020 |
| JP | 2020-107290 | A | 7/2020 |
| JP | 2020-108058 | A | 7/2020 |
| JP | 2020-108060 | A | 7/2020 |
| JP | 2020-109541 | A | 7/2020 |
| JP | 2020-109542 | A | 7/2020 |
| JP | 2020-109579 | A | 7/2020 |
| JP | 2020-109594 | A | 7/2020 |
| JP | 2020-109595 | A | 7/2020 |
| JP | 2021-050933 | A | 4/2021 |
| JP | 2021-050934 | A | 4/2021 |
| JP | 2021-050935 | A | 4/2021 |
| JP | 2021-051377 | A | 4/2021 |
| JP | 2021-051378 | A | 4/2021 |
| JP | 2021-051379 | A | 4/2021 |
| JP | 2021-051380 | A | 4/2021 |
| JP | 2021-051381 | A | 4/2021 |
| JP | 2021-051382 | A | 4/2021 |
| JP | 2021-052233 | A | 4/2021 |
| JP | 2021-052234 | A | 4/2021 |
| JP | 2021-052235 | A | 4/2021 |
| JP | 2021-052236 | A | 4/2021 |
| JP | 2021-052237 | A | 4/2021 |
| JP | 2021-052238 | A | 4/2021 |

* cited by examiner

NOTIFICATION DEVICE AND NOTIFICATION SYSTEM

CROSS-REFERENCE TO RELATED APPLICATION

This application is based on and claims the benefit of priority from earlier Japanese Patent Application No. 2024-096749 filed on Jun. 14, 2024, the descriptions of all of which are incorporated herein by reference.

TECHNICAL FIELD

The present disclosure relates to a notification device and a notification system.

BACKGROUND

In recent years, it has been considered that a vehicle should be equipped with a function to capture images of conditions inside a cabin by an on-board camera. The images captured by the on-board camera may be used or recorded to estimate whether a driver is looking away or has their eyes closed using facial image recognition technology.

SUMMARY

A notification device according to the present disclosure includes an image acquisition unit that acquires images from a camera that captures images of an interior of a vehicle, a steady-state determination unit that determines whether a non-temporary malfunction state occurs in a camera system including the camera in a steady-state condition based on the images acquired by the image acquisition unit, a memory processing unit that stores, in a storage area, malfunction information that is information regarding the non-temporary malfunction state determined by the steady-state determination unit in response to an ignition of the vehicle being changed from an on state to an off state, a start-up determination unit that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit that outputs an alarm to notify the driver when the steady-state determination unit or the start-up determination unit determines that the camera system is in the non-temporary malfunction state. The start-up determination unit includes a previous information acquisition unit that acquires the malfunction information stored in the storage area when the control unit of the vehicle was turned off from a previous power-on state, and a provisional determination unit that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

A notification system according to the present disclosure includes an image acquisition unit that acquires images from a camera that captures images of an interior of a vehicle, a steady-state determination unit that determines whether a non-temporary malfunction state occurs in a camera system including the camera in a steady-state condition based on the images acquired by the image acquisition unit, a storage area that stores malfunction information, which is information about a non-temporary malfunction state occurring in the camera system as determined by the steady-state determination unit in a manner that is not erased when the power of a control unit of the vehicle is turned off, a memory processing unit that stores the malfunction information in the storage area in response to the vehicle's ignition being turned off from an on state, a start-up determination unit that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit that notifies a driver when the steady-state determination unit or the start-up determination unit determines that the non-temporary malfunction state exists. The start-up determination unit includes a previous information acquisition unit that acquires the malfunction information stored in the storage area when the control unit was turned off from a previous power-on state, and a provisional determination unit that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
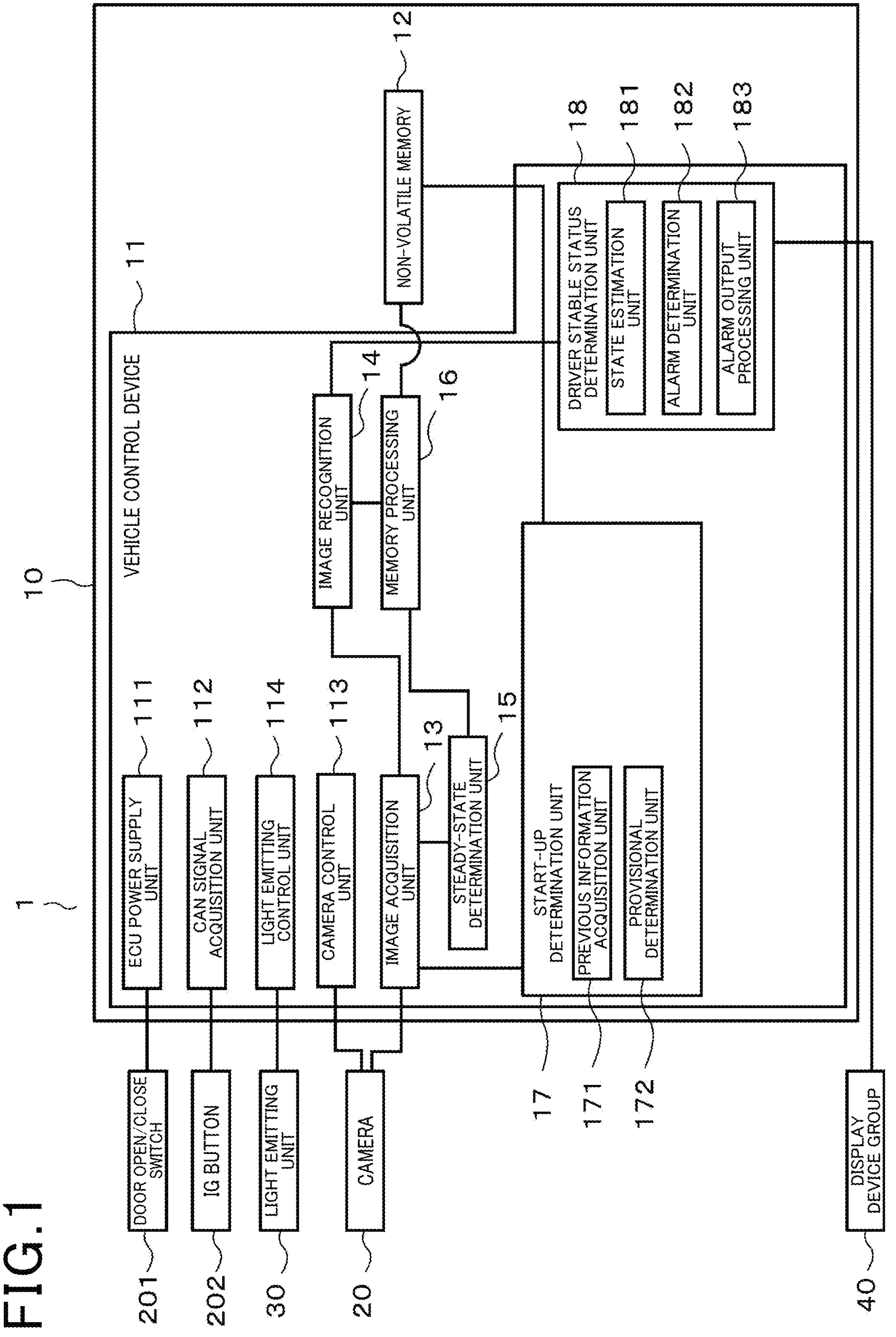
FIG. 1 shows a block diagram outlining an example configuration of a notification device according to a first embodiment.

There are cases where the captured images are not continuously available, for example, when a foreign object adheres to a lens of the on-board camera. Therefore, technologies have been proposed to detect the occurrence of continuous, i.e., non-temporary, malfunctions in the on-board camera, such as the adhesion of foreign objects.

For example, JP 2019-106644 A discloses an adhesion detection device including: a division unit that divides an image captured by an imaging device into a plurality of partial regions; a calculation unit that calculates, for each partial region divided by the division unit, an average value of a first value and a variation of the first value based on color information of pixels included in the partial region; and a detection unit that detects, as an object-attached region, the partial region in which the average value and the variation calculated by the calculation unit each satisfy a predetermined object-attached condition.

If a user expects to use the images captured by the on-board camera while driving, it is preferable to notify the driver before the start of driving that a non-temporary malfunction state is occurring, i.e., the on-board camera is not available. However, determining the presence or absence of the non-temporary malfunction state of the on-board camera requires 5 to 30 minutes of observation. Therefore, it is difficult to determine the non-temporary malfunction state of the on-board camera and notify the driver after the vehicle system is started and before the vehicle starts running, and the driver may be notified of the non-temporary malfunction state sometime after the vehicle starts running, for example. In this case, it is difficult for the driver to immediately resolve the non-temporary malfunction state.

The present disclosure has been made to solve the above problem, and the main purpose of which is to provide a notification device and a notification system that reduce the processing time for determining a non-temporary malfunction state after a startup of a vehicle's control unit.

A notification device according to the present disclosure includes an image acquisition unit that acquires images from a camera that captures images of an interior of a vehicle, a steady-state determination unit that determines whether a non-temporary malfunction state occurs in a camera system including the camera in a steady-state condition based on the images acquired by the image acquisition unit, a memory processing unit that stores, in a storage area, malfunction information that is information regarding the non-temporary malfunction state determined by the steady-state determination unit in response to an ignition of the vehicle being changed from an on state to an off state, a start-up determination unit that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit that outputs an alarm to notify the driver when the steady-state determination unit or the start-up determination unit determines that the camera system is in the non-temporary malfunction state. The start-up determination unit includes a previous information acquisition unit that acquires the malfunction information stored in the storage area when the control unit of the vehicle was turned off from a previous power-on state, and a provisional determination unit that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

According to the notification device of the present disclosure, since the non-temporary malfunction state is determined using the malfunction information stored at the time of the last vehicle disembarkation, instead of using the images captured by the camera after the vehicle controller is activated, the processing time for determining the non-temporary malfunction state during the current ride can be reduced. Therefore, even in cases where the steady-state determination unit cannot determine whether the non-temporary malfunction state exists during the period before the start of operation, such as when operation is started within a short period of time after the ECU power is turned on, the non-temporary malfunction state that is provisionally determined with probability can be notified to the driver. This improves driver convenience and vehicle driving safety.

A notification system according to the present disclosure includes an image acquisition unit that acquires images from a camera that captures images of an interior of a vehicle, a steady-state determination unit that determines whether a non-temporary malfunction state occurs in a camera system including the camera in a steady-state condition based on the images acquired by the image acquisition unit, a storage area that stores malfunction information, which is information about a non-temporary malfunction state occurring in the camera system as determined by the steady-state determination unit in a manner that is not erased when the power of a control unit of the vehicle is turned off, a memory processing unit that stores the malfunction information in the storage area in response to the vehicle's ignition being turned off from an on state, a start-up determination unit that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit that notifies a driver when the steady-state determination unit or the start-up determination unit determines that the non-temporary malfunction state exists. The start-up determination unit includes a previous information acquisition unit that acquires the malfunction information stored in the storage area when the control unit was turned off from a previous power-on state, and a provisional determination unit that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

According to the notification system of the present disclosure, since the non-temporary malfunction state is determined using the malfunction information stored at the time of the last vehicle disembarkation, instead of using the images captured by the camera after the vehicle controller is activated, the processing time for determining the non-temporary malfunction state during the current ride can be reduced. Therefore, even in cases where the steady-state determination unit cannot determine whether the non-temporary malfunction state exists during the period before the start of operation, such as when operation is started within a short period of time after the ECU power is turned on, the non-temporary malfunction state that is provisionally determined with probability can be notified to the driver. This improves driver convenience and vehicle driving safety.

The following describes a plurality of embodiments of a notification system and a notification device with reference to the drawings.

The same reference numerals are used for substantially identical configurations in the plurality embodiments, and repeated explanations are omitted.

First Embodiment

The first embodiment will be described with reference to FIGS. 1 to 7. A notification system 1 is equipped with a notification device 10. The notification device 10 is a device mounted on a moving object, such as a vehicle, for example. The notification device 10 is connected to a camera 20, a light emitting unit 30, a display device group 40, a door open/close switch 201, and an ignition (IG) button 202 in the vehicle through an in-vehicle network such as CAN (Controller Area Network).

The notification system 1 or the notification device 10 has a function of notifying a user, in this case a driver, of the availability of images captured by the camera 20. The camera 20 and the light emitting unit 30 constitute a camera system for capturing images of the vehicle's interior. In the present specification, a state in which the camera system is unable to capture images normally for a predetermined period of time or longer is referred to as a non-temporary malfunction state, for example, when a foreign object adheres to a lens of the camera 20 or when the camera 20 or the light emitting unit 30 is blinded. The notification system 1 or the notification device 10 has a function of notifying the user, in this case the driver, via alarm output means such as the display device group 40, when the non-temporary malfunction state occurs.

The camera 20 has a function of capturing images of objects inside the vehicle's cabin. An imaging target may be, for example, the driver's face or the driver's upper body. The light emitting unit 30 has a function of projecting light on the imaging target to assist the camera 20 in acquiring a good image when capturing images. The display device group 40 includes, for example, meters, in-vehicle infotainment (IVI), etc.

Figure 2:
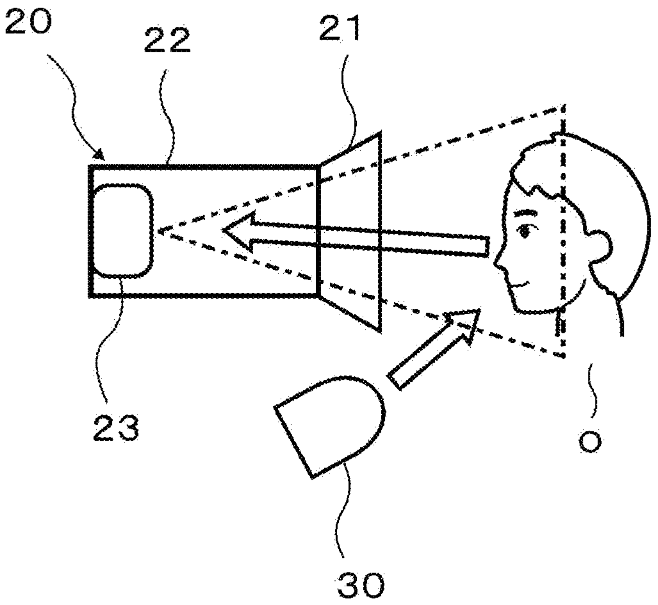
FIG. 2 shows a schematic diagram of a camera system that includes a camera and a light emitting unit.

As shown in FIG. 2, the camera 20 consists of a lens 21, a lens barrel 22, and an image sensor 23. The lens 21 is positioned in such an orientation and position that an imaging target O, in this case the driver's face, for example, is included in the imaging range. The lens 21 is positioned at a tip of the lens barrel 22, and the image sensor 23 is placed on an opposite side of the lens barrel 22 from the lens 21. The image sensor 23 can be composed of a CCD (Charge Coupled Device) or CMOS (Complementary Metal Oxide Semiconductor), for example. The light collected by the lens is received by the image sensor 23. The light emitting unit 30 is composed of an infrared light source, such as an LED (light-emitting diode), for example, and projects light onto the imaging target to obtain a more appropriate image depending on the brightness in the cabin. Note that the light emitting unit 30 is configured to project light in conjunction with the shutter opening timing of the camera 20. The camera 20 sends the captured images to the notification device 10.

(Non-Temporary Malfunction State)

Figure 3:
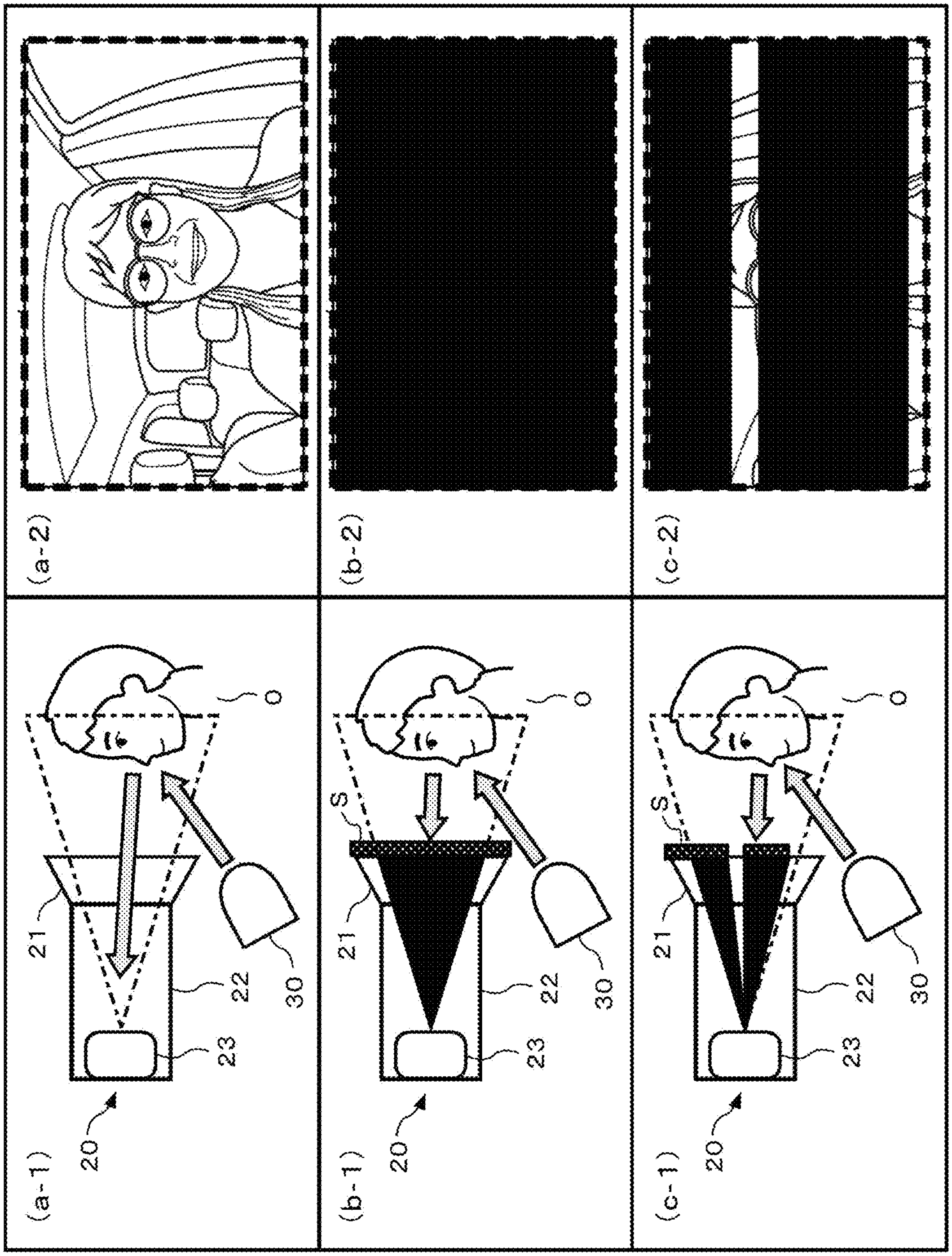
FIG. 3 shows an example figure of unshielded and shielded states.

Examples of the non-temporary malfunction states that may occur in the camera system are described below. The non-temporary malfunction state in the present specification refers to a state in which the lens 21 of the camera 20 or a projection surface of the light emitting unit 30 is continuously shielded and the imaging target cannot be captured. FIG. 3 shows examples of images taken depending on the presence or absence of camera occlusions and their types in the camera 20. In all of the examples shown in FIG. 3, the light emitting unit 30 is assumed to be unshielded. As shown in (a-1), a case where the camera 20 is not shielded, i.e., the unsealed state is indicated. For example, if there is no foreign matter adhering to the lens 21 and there is no shield to blind the lens 21, the light from the face of the imaging target O, for example, the driver, will reach the image sensor 23 without being blocked. Therefore, the imaging target O is imaged as shown in (a-2). As shown in (b-1), when the camera 20 is shielded, in this case, for example, when there is a shield S covering the entire imaging surface of the lens 21, all light from the imaging target O is blocked and does not reach the image sensor 23. As a result, as shown in (b-2), the entire captured image becomes a black image with the entire image filled in black. Note that in this case, the distance between the lens 21 and the shield S to be sighted is very small and practically zero, the so-called zero distance state. As shown in (c-1), when the camera 20 is shielded, for example, when a foreign object, i.e., a shield S, is adhered to one or more parts of the imaging surface of the lens 21, the light is blocked by the shield S. Therefore, as shown in (c-2), the portion of the captured image corresponding to the area blocked by the shield S is filled in black.

Figure 4:
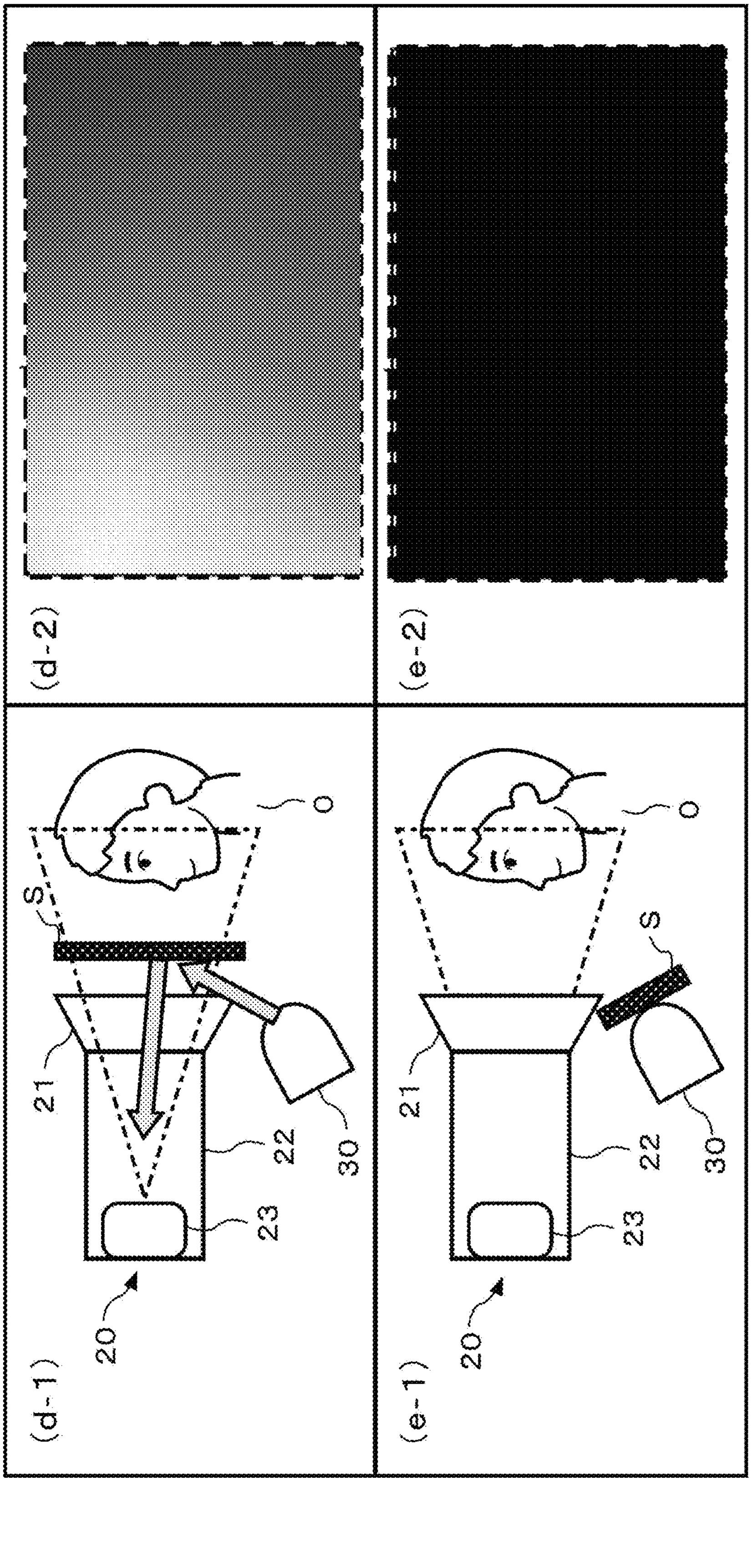
FIG. 4 shows another example figure of shielded states.

FIG. 4 shows examples of images taken when other camera occlusions occur. In the example shown in (d-1), the shield S is located a short distance away from the lens 21. In other words, the lens 21 is shielded at non-zero distance. In this case, the light from the light emitting unit 30 does not reach the image and the image may be black as in (b-2), however, the light from the light emitting unit 30 may reflect off the shield S and reach the image sensor 23. In such a case, as shown in (d-2), for example, the image may be a blown-out color image or a gray image halfway between the white and black images.

In the example shown in (e-2), the projection surface of the light emitting unit 30 is shielded by the shield S. In this case, if sufficient brightness is available from the outside, as for example in the cabin during the daytime, the image can be captured as in (a-2), however, if sufficient brightness is not available from the outside, as for example in the cabin at night, the captured image may be a black image as in (e-2).

The notification device 10 includes a vehicle control device (hereinafter referred to as an ECU (Electronic Control Unit)) 11 and a non-volatile memory 12. The ECU 11 is the main body of control for the entire notification system 10 and also has a function of controlling the various electronic devices installed in the vehicle. The ECU 11 is connected to the door open/close switch 201, the IG button 202, the camera 20, the light emitting unit 30, the display device group 40, etc. through an in-vehicle network such as CAN (Controller Area Network). The non-volatile memory 12 as the storage area stores information in a manner that the stored information is not erased even when the notification device 10 is not supplied with power. The non-volatile memory 12 can be composed of a ROM (Read Only Memory) or a flash memory, for example.

The vehicle is equipped with the door open/close switch 201 and the IG button 202. The door open/close switch 201 detects the opening and closing of the vehicle doors. With the ECU power supply unit 111 turned off, the ECU power supply unit 111 is turned on when the vehicle door is opened from a closed state. The IG button 202 accepts engine start or stop operations from the driver. The ECU 11 switches an ignition, not shown, of the vehicle on and off.

The ECU 11 has an ECU power supply unit 111, a CAN signal acquisition unit 112, a camera control unit 113, and a light emitting control unit 114. The ECU power supply unit 111 is the driving power source for the notification device 10. The CAN signal acquisition unit 112 is connected to the door open/close switch 201, the IG button 202, the camera 20, the light emitting unit 30, the display device group 40, etc. through an in-vehicle network such as CAN, for example. The camera control unit 113 controls the operation of the camera 20. The light emitting control unit 114 controls the operation of the light emitting unit 30. The camera control unit 113 and the light emitting control unit 114 may detect the luminance distribution of the face area of the imaging target, in this case the driver, which changes from time to time, and control the imaging conditions of the camera system so that the face can be imaged with the preferred degree of shading. For example, the camera control unit 113 can control an exposure time and a gain amount. In addition, the light emitting control unit 114 can control a light intensity.

Note that in the present embodiment, the camera 20 and/or the light emitting unit 30 are connected to the ECU 11 through an in-vehicle network such as CAN, but is not limited to this. For example, in other embodiments, the camera 20 and/or the light emitting unit 30 may be connected to the ECU 11 by wiring dedicated to the camera system.

The notification device 10 has an image acquisition unit 13, an image recognition unit 14, a steady-state determination unit 15, a memory processing unit 16, a start-up determination unit 17, and a driver stable status determination unit 18. The image acquisition unit 13, the image recognition unit 14, the steady-state determination unit 15, the memory processing unit 16, the start-up determination unit 17, and the driver stable status determination unit 18 are realized in software by the ECU executing the program stored in the non-volatile memory 12. Note that any one or all of the image acquisition unit 13, the image recognition unit 14, the steady-state determination unit 15, the memory processing unit 16, the start-up determination unit 17, and the driver stable status determination unit 18 may be configured by hardware or realized by a combination of software and hardware.

The image acquisition unit 13 has a function of acquiring images captured by the camera 20. The image recognition unit 14 acquires the image captured by the camera 20 via the image acquisition unit 13 and recognizes the image capture object appearing in the image, in this case the driver's face. The steady-state determination unit 15 determines whether a non-temporary malfunction state occurs in the camera system under steady-state conditions in which the notification device 10 is routinely driven by the ECU power supply unit 111. The memory processing unit 16 stores in the non-volatile memory 12 the malfunction information, which is the information indicating whether the camera system is in a non-temporary malfunction state as determined by the steady-state determination unit 15 under predetermined conditions. The start-up determination unit 17 determines whether the camera system is in a non-temporary malfunction state during a predetermined period of time after the ECU power supply unit 111 starts supplying drive power, i.e., until the steady-state determination unit 15 can make a determination. In other words, the start-up determination unit 17 determines whether the camera system is in a non-temporary malfunction state during the period from when the ECU power supply unit 111 starts supplying drive power until it reaches a steady state. The driver stable status determination unit 18 recognizes the image captured by the camera system, in this case the driver's face image, and has a function of detecting the driver unfitness to drive, such as looking aside or falling asleep while driving, or inability to drive, such as coma, and alerting the driver to such conditions.

The operation suitability judgment unit 18 includes a state estimation unit 181, an alarm determination unit 182, and an alarm output processing unit 183. The state estimation unit 181 calculates the driver state using the driver's facial physical state calculated by the image recognition unit 14 as input information. In the present specification, facial physical state means the physical state of the face, including facial position, facial orientation, degree of eye opening and closing, direction of gaze, etc. In addition, the driver state includes at least "normal" and "unsuitable". "Normal" is a state in which the driver's face is facing forward. "Unsuitable" includes, for example, when the driver's eyes are closed for more than 2 seconds, when the driver is asleep, or when the driver's face is out of the angle of view of the camera 20 for more than 10 seconds, i.e., when the driver is in an awkward position. The alarm determination unit 182 determines whether an alarm should be issued based on the driver state calculated by the state estimation unit 181. For example, if the driver's condition is "normal," the alarm determination unit 182 determines that an alarm is unnecessary because the driver is in a suitable condition for driving. If the driver state is "unsuitable," the alarm determination unit 182 determines that the driver is not suitable for driving and requires an alarm.

The alarm output processing unit 183 sends instructions to alarm output means to output alarms based on the determination results of the alarm determination unit 182. The alarm output means can be realized by various means, such as optical, auditory, tactile, olfactory, etc. For example, the alarm output means may be realized by the display device group 40, including meters and IVIs.

The steady-state determination unit 15 determines whether the non-temporary malfunction state is occurring in the camera system based on a plurality of images acquired by the image acquisition unit 13 during a time window set in a predetermined period. The predetermined period can be set in the range of 5 to 30 minutes, for example. In other words, at least during the predetermined period of time after the ECU power supply unit 111 starts supplying drive power and the camera 20 starts capturing images, the steady-state determination unit 15 is unable to determine whether the non-temporary malfunction state exists. Therefore, during this time, the start-up determination unit 17 provisionally determines whether the non-temporary malfunction state exists.

The memory processing unit 16 has a function of storing in the storage area, e.g., non-volatile memory 12, the malfunction information, which is the information indicating the presence or absence of the non-temporary malfunction state of the camera system determined by the steady-state determination unit 15 immediately before in accordance with the IG button 202 being operated and the IG-ON (ignition on) state is turned to the IG-OFF (ignition off) state. Note that in other embodiments, the notification system 1 may store the malfunction information in a server or other device connected to a network system outside the vehicle as a storage area instead of the non-volatile memory 12. In addition, the memory processing unit 16 may store the malfunction state in the storage area every predetermined period of time while the ECU power supply unit 111 is turned on. In this case, the storage processing unit 16 may overwrite the latest malfunction state with the previous malfunction state. In other words, the non-volatile memory 12 stores at least the last malfunction state determined by the steady-state determination unit 15 and stored by the memory processing unit 16.

The start-up determination unit 17 includes a previous information acquisition unit 171 and a provisional determination unit 172. The previous information acquisition unit 171 acquires the previous information when the ECU power supply unit 111 is turned ON from the OFF state by the door open/close switch 201. The previous information is the malfunction information that was stored in the non-volatile memory 12 at the time the ECU power supply unit 111 was turned off from the previous ON state. In other words, the previous information is the malfunction information stored in the non-volatile memory 12 at the end of the period between the last time the ECU power supply unit 111 was in the ON state and the OFF state. The provisional determination unit 172 provisionally determines the current non-temporary malfunction state of the camera system based on at least the previous information.

In this case, if the previous information is present for the non-temporary malfunction state, the provisional determination unit 172 provisionally determines the current non-temporary malfunction state to be present. If the previous information is absent for the non-temporary malfunction state, the provisional determination unit 172 provisionally determines the current non-temporary malfunction state to be absent. If the provisional determination unit 172 determines that the non-temporary malfunction state is present, the start-up determination unit 17 notifies the driver stable status determination unit 18 that the non-temporary malfunction state is present. The alarm output processing unit 183 notifies the driver via the display device group 40, etc. that the image captured by the camera 20 is not available. This allows the driver to be notified that the image captured by the camera 20 cannot be used during the period between the activation of the ECU power supply unit 111 and when the steady-state determination unit 15 is ready to make a determination. Thus, the driver can recognize the contents of the notification before starting to drive. In addition, in some cases, the driver can also take measures to eliminate non-temporary malfunctions in the camera system before starting to drive.

(Flowchart of the Steady-State Determination Unit)

Figure 5:
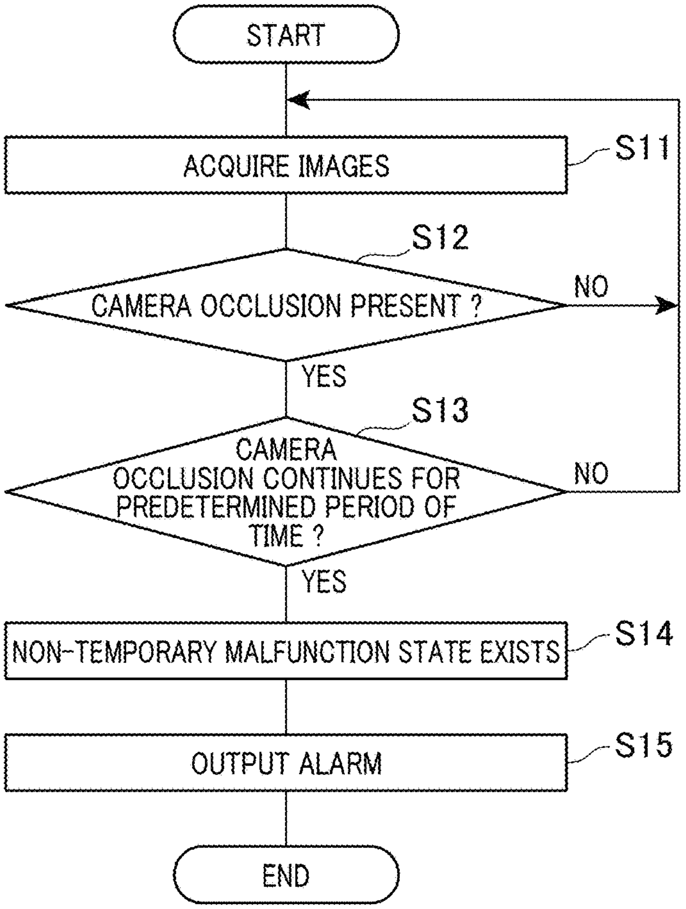
FIG. 5 shows an example of a flowchart showing a steady-state processing of a notification device according to the first embodiment.

Referring to the flowchart shown in FIG. 5, the process of the notification device 10 in steady state is described. At the start of FIG. 5, it is assumed that the notification device 10 is supplied with drive power from the ECU power supply unit 111 and that a predetermined period of time has elapsed since the start of image capture by the camera 20. Note that in the flowcharts of the present specification, the processing by each component is described as processing by the notification device 10.

In step S11, the notification device 10 acquires images from the camera 20. Note that the camera 20 acquires images a plurality of times during a given period, for example, approximately 30 times per second. In step S12, the notification device 10 determines whether the image acquired by the image acquisition unit 13 has a camera occlusion. If it is determined that there is no camera occlusion (NO in step S12), the notification device 10 returns the process to step S11. If it is determined that there is a camera occlusion (YES in step S12), the notification device 10 advances the process to step S13. In step S13, the notification device 10 determines whether the camera occlusion continues for a predetermined period of time, for example, 5 minutes or longer. In this case, the steady-state determination unit 15 determines whether the camera occlusion occurs in all of the plurality of images acquired by the image acquisition unit 13, i.e., the images taken during the predetermined period. If the camera occlusion has not continued for a predetermined period of time or longer (NO in step S13), the notification device 10 returns the process to step S11. If the camera occlusion continues for a predetermined period or longer (YES in step S13), the notification device 10 advances the process to step S14. In step S14, the notification device 10 determines that there is a non-temporary malfunction state and that the camera system is unavailable. In step S15, the notification device 10 sends an instruction to, for example, the display device group 40 to notify the driver that the camera system is unavailable. In this way, the process of the notification device 10 in steady state is executed. Note that the notification device 10 may return to step S11 again after outputting the alarm.

(Flowchart at IG-OFF)

Figure 6:
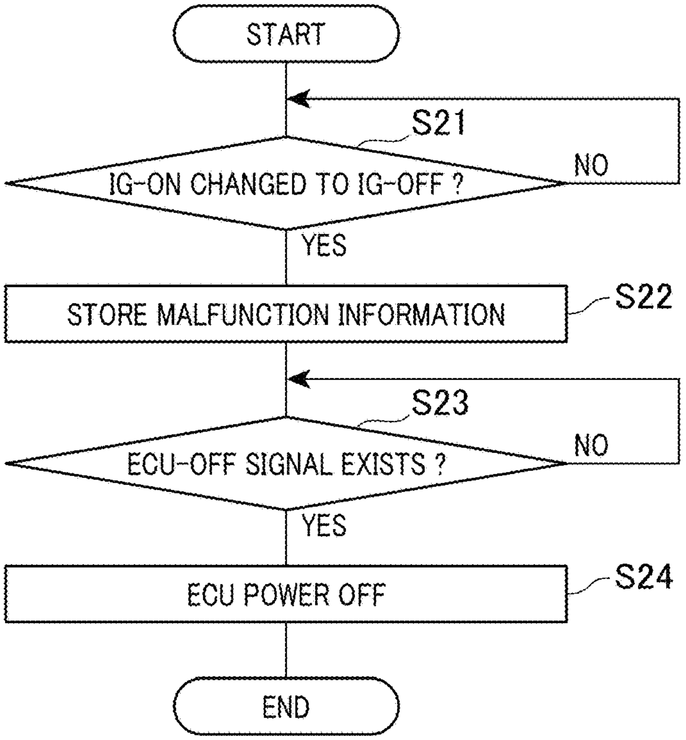
FIG. 6 shows an example of a flowchart showing a process when the notification device goes from an IG-ON state to an IG-OFF state according to the first embodiment.

Referring to the flowchart shown in FIG. 6, the process by the notification device 10 in a case of receiving an operation to the IG button 202 to change the IG-ON state to the IG-OFF state is described. Note that at the start of FIG. 6, the IG is ON state.

In step S21, the notification device 10 determines whether the CAN signal acquisition unit 112 has detected that the IG button 202 has been operated off. In other words, the notification device 10 determines whether the IG-ON state has changed to the IG-OFF state. If the CAN signal acquisition unit 112 has not detected the operation to set IG-OFF (NO in step S21), the notification device 10 repeats the process of step S21. If the CAN signal acquisition unit 112 has detected the operation to set IG-OFF (YES in step S21), the notification device 10 advances the process to step S22. In step S22, the notification device 10 records in the non-volatile memory 12 the malfunction information determined immediately before the change from the IG-ON state to the IG-OFF state. In other words, the presence or absence of the camera occlusion determined in step S12 of FIG. 5 is recorded in the non-volatile memory 12. As a result, the non-volatile memory 12 as the storage area stores the malfunction state immediately before the change from the IG-ON state to the IG-OFF state in a queryable manner.

In step S23, the notification device 10 determines whether there is an ECU-OFF signal. In other words, the notification device 10 determines whether the CAN signal acquisition unit 112 detects the ECU power OFF signal. If the ECU power OFF signal is not detected (NO in step S23), the notification device 10 repeats the process of step S23. If the ECU power OFF signal is detected (YES in step S23), the notification device 10 advances the process to step S24. In step S24, the ECU power supply unit 111 stops supplying drive power. In this way, the process by the notification device 10 in the case of the IG-OFF state from the IG-ON state is executed.

(Flowchart when ECU Power is Turned on)

Figure 7:
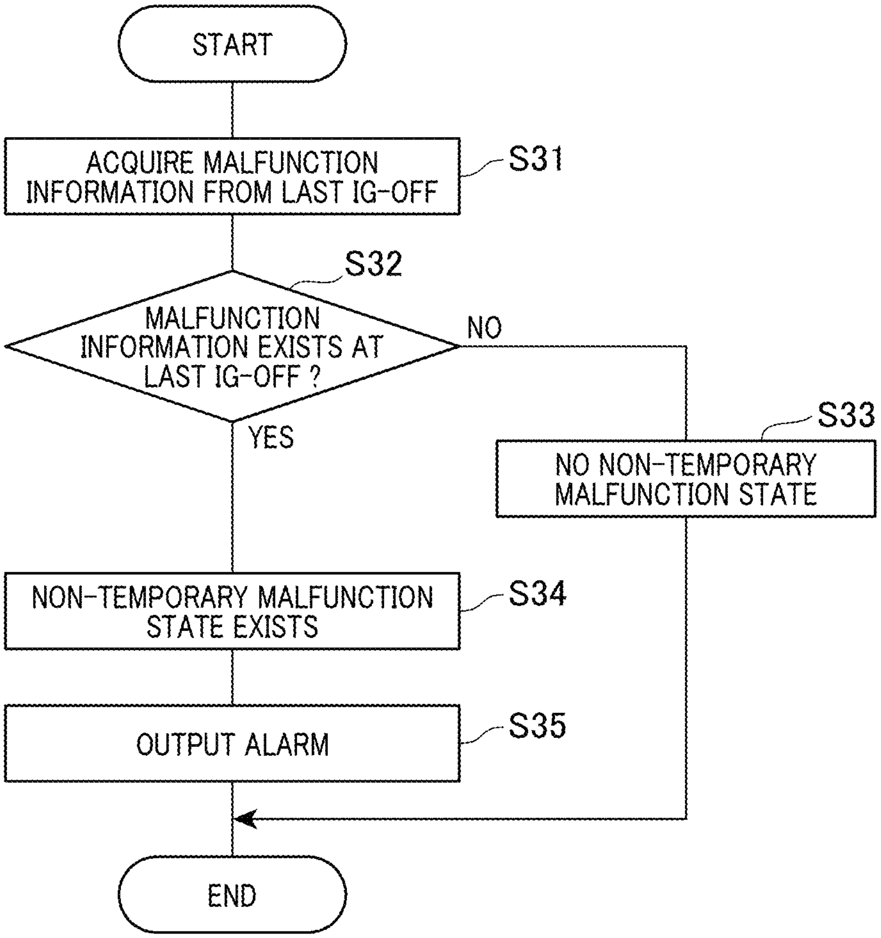
FIG. 7 shows an example of a flowchart showing a process when the notification device goes from an ECU power OFF state to an ECU power ON state according to the first embodiment.
Figure 8:
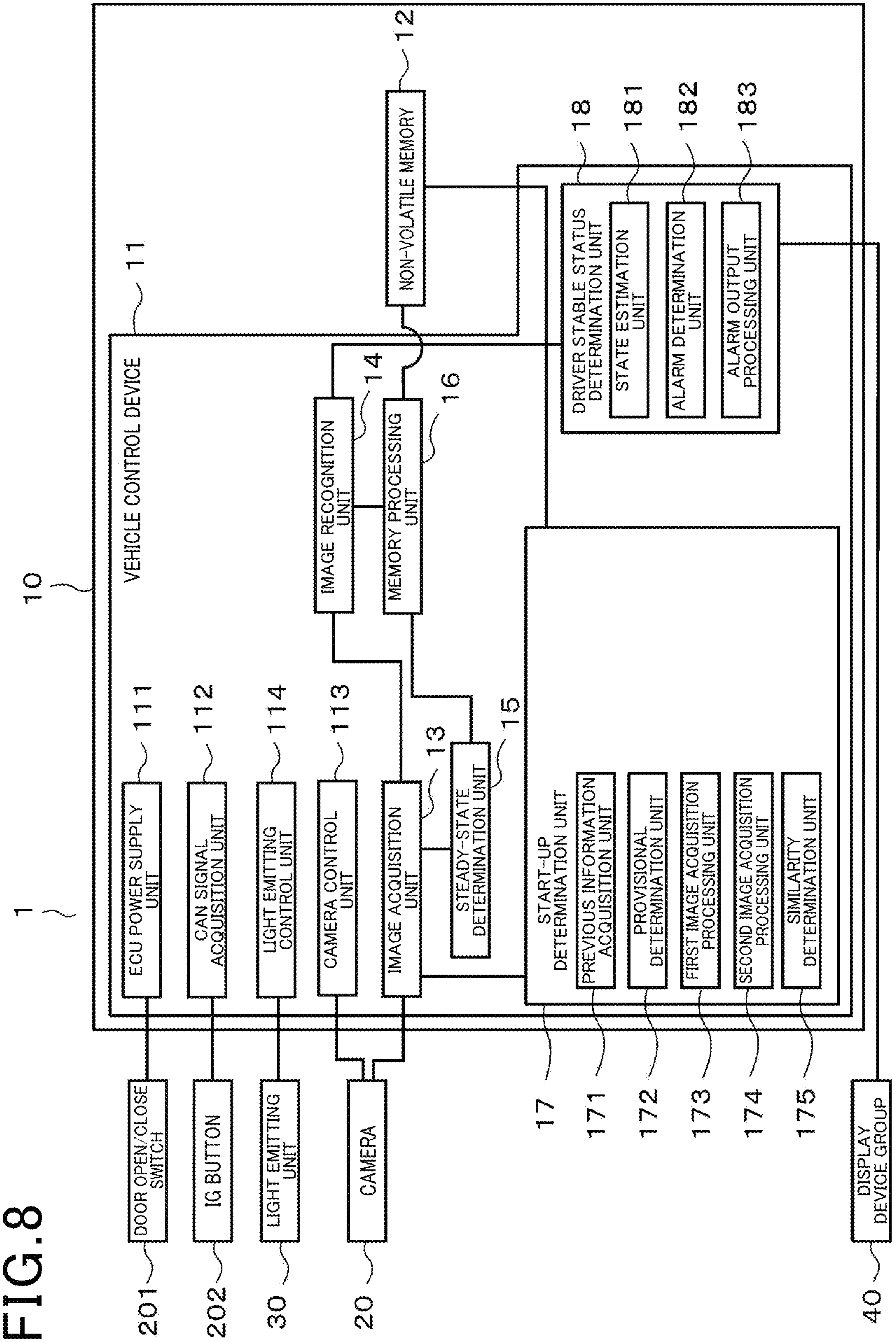
FIG. 8 shows a block diagram outlining an example configuration of a notification device according to a second embodiment.

Referring to the flowchart shown in FIG. 7, the processing by the notification device 10 when the ECU power is turned ON from the ECU power OFF state is described. Note that at the start of FIG. 7, the ECU power supply unit is turned on and power is supplied from the ECU power supply unit 111, however, the IG is at OFF state.

In step S31, the notification device 10 acquires the previous information recorded in the non-volatile memory 12 at the time of the last IG-OFF. In step S32, the notification device 10 determines whether the previous information is in the malfunction state. If the previous information is not in the malfunction state (NO in step S32), the notification device 10 advances the process to step S33. In step S33, the notification device 10 provisionally determines that there is no non-temporary malfunction in the current camera system.

If the previous information is in the malfunction state (YES in step S32), the notification device 10 advances the process to step S34. In step S34, the notification device 10 provisionally determines that there is currently the non-temporary malfunction in the camera system. In step S35, the notification device 10 sends a command to warn the driver that the camera system is unavailable, for example, to the display device group 40. In this case, the display device group 40 can notify the driver that the camera system is unavailable, for example, by turning on a warning light. In this way, the process of the notification device 10 in the case of ECU power ON is executed.

Note that the non-temporary malfunction state may be intentionally caused by the driver, for example, by hanging a hat or cloth over the camera 20 or the light emitting unit 30. In this case, if the same driver drives the vehicle continuously, the driver should be aware that the camera 20 or the light emitting unit 30 is experiencing a camera occlusion. On the other hand, when a driver takes a turn, or even the same driver gets out of the vehicle once and drives again after some time has passed, the driver may not be aware that the non-temporary malfunction state has occurred. In preparation for such a case, it is preferable to notify the driver of the occurrence of the non-temporary malfunction state during the period after the ride and before the ride becomes normal. In addition, if a non-temporary malfunction state occurs in the camera system before the IG-OFF state from the previous IG-ON state, even after the ECU power supply unit changes from the ECU power OFF state to the ECU power ON state this time, there is a high probability that the camera system is experiencing the non-temporary malfunction state.

In contrast, the notification device 10 in the present embodiment described above includes the image acquisition unit 13, the steady-state determination unit 15, the memory processing unit 16, the start-up determination unit 17, and the alarm output processing unit 183. The image acquisition unit 13 acquires images from the camera 20 that captures images of the vehicle interior. The steady-state determination unit 15 determines whether the non-temporary malfunction state occurs in the camera system including the camera 20 and/or the light emitting unit 30 in the steady state based on the images acquired by the image acquisition unit 13. The memory processing unit 16 stores in the non-volatile memory 12 as a storage area the malfunction information, which is the information about the non-temporary malfunction state determined by the steady-state determination unit 15 in response to the vehicle ignition being turned off from the ON state. The start-up determination unit 17 determines whether the non-temporary malfunction state is occurring in the camera system during the period from the time when the ignition is turned from the OFF state to the ON state until the steady-state determination unit 15 is able to make a determination. The alarm output processing unit 183 outputs an alarm to notify the driver when the steady-state determination unit 15 or the start-up determination unit 17 determines that the non-temporary malfunction state exists. The start-up determination unit 17 includes the previous information acquisition unit 171 that acquires the malfunction information stored in the non-volatile memory 12 when the ECU 11, which is the control unit of the vehicle, was turned off from the previous power-on state, and the provisional determination unit 172, which determines the existence of the non-temporary malfunction state if the malfunction information obtained by the previous information acquisition unit 171 indicates that there is the non-temporary malfunction state, and determines the existence of the non-temporary malfunction state if the malfunction information obtained by the previous information acquisition unit 171 indicates no non-temporary malfunction state.

The notification system 1 in the present embodiment includes the image acquisition unit 13, the steady-state determination unit 15, the non-volatile memory 12 as a storage area, the memory processing unit 16, the start-up determination unit 17, and the alarm output processing unit 183. The image acquisition unit 13 acquires images from the camera 20 that captures images of the vehicle interior. The steady-state determination unit 15 determines whether the non-temporary malfunction state occurs in the camera system including the camera 20 in the steady state based on the images acquired by the image acquisition unit 13. The non-volatile memory 12 stores malfunction information, which is information about the non-temporary malfunction state occurring in the camera system as determined by the steady-state determination unit 15 in a manner that is not erased when the vehicle's control unit is turned off. The memory processing unit 16 stores the malfunction information in the non-volatile memory 12 in response to the vehicle ignition being turned off from the ON state. The start-up determination unit 17 determines whether the non-temporary malfunction state is occurring in the camera system during the period from the time when the ignition is turned from the OFF state to the ON state until the steady-state determination unit 15 is able to make a determination. A notification unit outputs an alarm to notify the driver when the steady-state determination unit 15 or the start-up determination unit 17 determines that the non-temporary malfunction state exists. The start-up determination unit 17 includes the previous information acquisition unit 171 that acquires malfunction information stored in the storage area when the vehicle control device was turned off from the previous power-on state, and the provisional determination unit 172, which determines the existence of the non-temporary malfunction state if the malfunction information obtained by the previous information acquisition unit 171 indicates that there is the non-temporary malfunction state, and determines the existence of the non-temporary malfunction state if the malfunction information obtained by the previous information acquisition unit 171 indicates no non-temporary malfunction state.

According to the notification device 10 or the notification system 1 in the present embodiment, instead of using the images captured by the camera after the vehicle's controller is activated to determine the non-temporary malfunction state, the malfunction information stored at the last time the vehicle was dismounted is used to determine the non-temporary malfunction state. Therefore, the period of time required to determine the non-temporary malfunction state can be shortened. Thus, even in cases where the steady-state determination unit 15 cannot determine whether the non-temporary malfunction state exists during the period before the start of operation, such as when operation is started within a short period of time after the ECU power supply unit 111 is turned on, the driver can be notified of the provisionally determined the non-temporary malfunction state with a high probability. As a result, driver convenience is improved and the safety of vehicle operation is enhanced because drivers can be notified prior to driving.

It should be noted that the notification device 10 in the present embodiment is composed of a single circuit board, but may be composed of a combination of a plurality of circuit boards. The notification system 1 in the present embodiment may composed of a plurality of physically separate configurations. In addition, some of the components of the notification system 1 may be installed in external devices such as smartphones or tablet terminals brought in by drivers or others from outside the vehicle, or in servers outside the vehicle that are connected by telecommunication lines such as the internet.

Second Embodiment

The second embodiment will be described with reference to FIGS. 8 to 12. In the present embodiment, a start-up determination unit 17 further includes a first image acquisition processing unit 173, a second image acquisition processing unit 174, and a similarity determination unit 175.

A memory processing unit 16 stores a previous image in a non-volatile memory 12 serving as a storage area before the ECU power supply is changed from ON to OFF the previous time. The previous image is an image acquired by an image acquisition unit 13 during the period from when the ECU power was last turned on to when it was turned off. More specifically, the previous image is an image acquired by the image acquisition unit 13 before the time of the last change from the IG-ON state to the IG-OFF state. In other words, the last image acquired by the image acquisition unit 13 in the previous steady state is the previous image. Note that the memory processing unit 16 may store the images acquired by the image acquisition unit 13 in the storage area every predetermined period of time during the IG-ON state. In this case, the memory processing unit 16 may overwrite the most recent image information onto the previous image information. That is, the non-volatile memory 12 stores the images that the image acquisition unit 13 acquires at predetermined intervals before the ECU power is turned off and that the memory processing unit 16 last stored in the non-volatile memory 12.

The first image acquisition processing unit 173 acquires a first image from the non-volatile memory 12 as the storage area. The second image acquisition processing unit 174 acquires a second image from the image acquisition unit 13. The second image is an image acquired by a camera 20 and acquired by the image acquisition unit 13 after an ECU power supply unit 111 is turned ON from the OFF state this time.

The similarity determination unit 175 compares the first image and the second image to determine whether they are similar. The similarity determination unit 175 compares, for example, the first image and the second image and calculates the similarity between the first image and the second image. The similarity determination unit 175 may determine that the first image and the second image are similar if their similarity is above a predetermined threshold value, and may determine that they are not similar if their similarity is below a predetermined threshold value. In this case, if similar camera occlusions occur when the first image and the second image are captured, similar shielded patterns will appear in both images, such as those shown in FIG. 3 (*b*-2), (*c*-2), and FIG. 4 (*d*-2), and (*e*-2). The determination of similarity or calculation of similarity by the similarity determination unit 175 can be performed by any known method. For example, the determination of similarity or the calculation of similarity can be performed using a luminance histogram.

Figure 9:
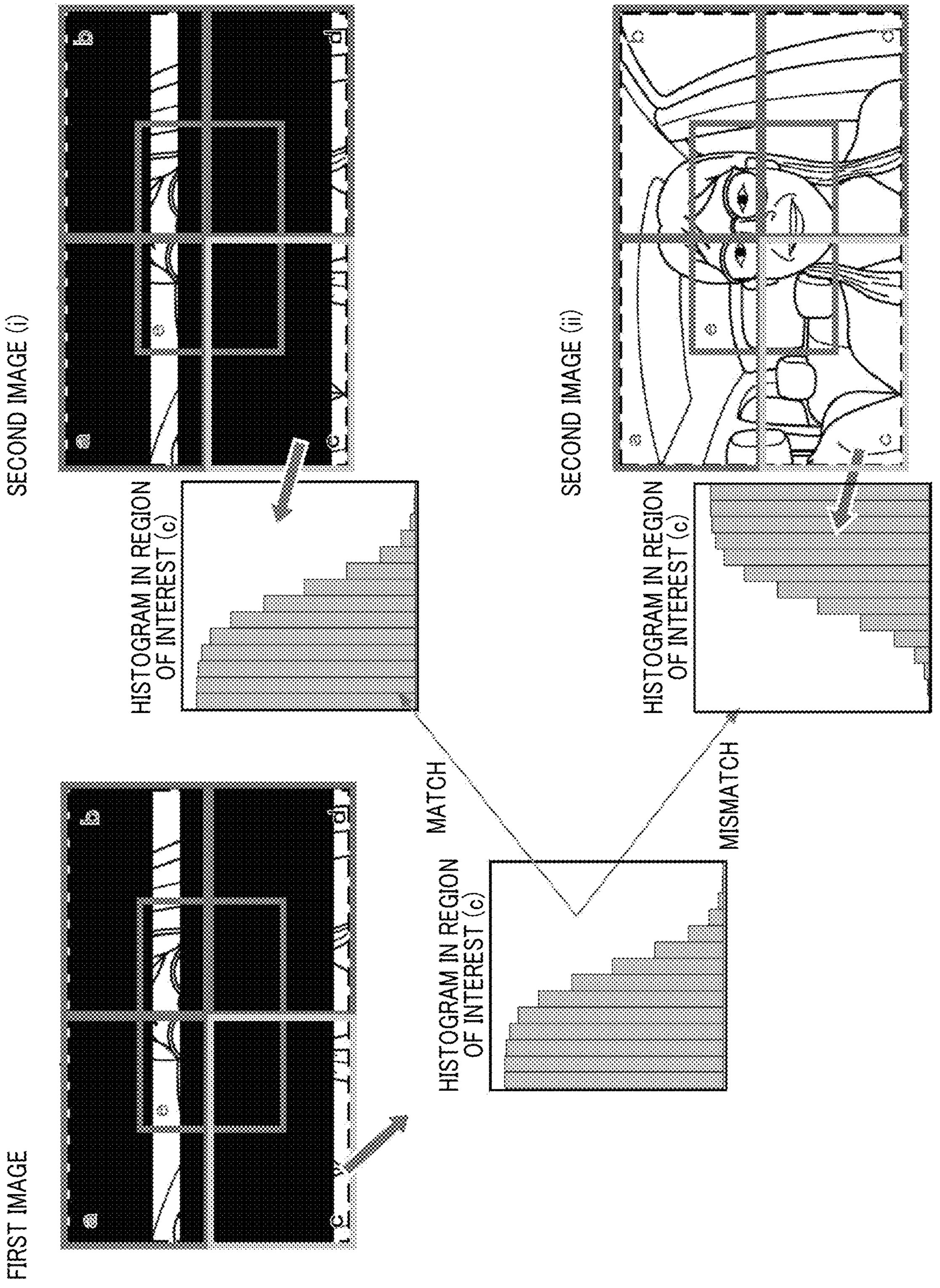
FIG. 9 shows a schematic diagram of an example of a similarity/dissimilarity calculation method by a similarity determination unit according to the second embodiment.

For example, as shown in FIG. 9, similarity/dissimilarity can be determined or similarity can be calculated by comparing the luminance histograms of the first image and the second image. The similarity determination unit 175 divides the first image and the second image into a plurality of regions, in this case five regions from region of interest (a) to region of interest (e). In this case, at least one or all of the plurality of regions may be set partly overlapping each other. The similarity determination unit 175 calculates the luminance histograms in the respective regions (a) to (e) of the first image and the second image. For example, the example shown in FIG. 9 shows an example of a luminance histogram in region of interest (c).

The similarity determination unit 175 compares the luminance histograms in each corresponding region of the first image and the second image. The similarity determination unit 175 determines that the first image and the second image are similar if the luminance histograms in all corresponding regions in the first image and the second image respectively match. The similarity determination unit 175 determines that the first image and the second image are not similar if the luminance histograms in at least one corresponding region do not match between the first image and the second image. The aforementioned predetermined threshold value for similarity can be set in the range of about 85% or more, about 90% or more, or about 95% or more, for example. In the present example, the predetermined threshold value for similarity in this case is 90%. In other words, in this case, the similarity determination unit 175 determines that the two images are similar if the calculated similarity between the first image and the second image is 90% or more than the predetermined threshold value, and determines that the two images are not similar if the calculated similarity between the first image and the second image is less than the predetermined threshold value of 90%.

For example, the luminance histogram of the region of interest (c) of the second image (i) shown in FIG. 9 matches the luminance histogram of the region of interest (c) of the first image. If the luminance histograms of the remaining region of interests (a), (b), (d), and (e) also match, respectively, the similarity determination unit 175 determines that the first image and the second image (i) are similar. The luminance histogram of the region of interest (c) in the second image (ii) does not match the luminance histogram of the region of interest (c) in the first image. The similarity determination unit 175 determines that the first image is not similar to the second image (ii).

Figure 10:
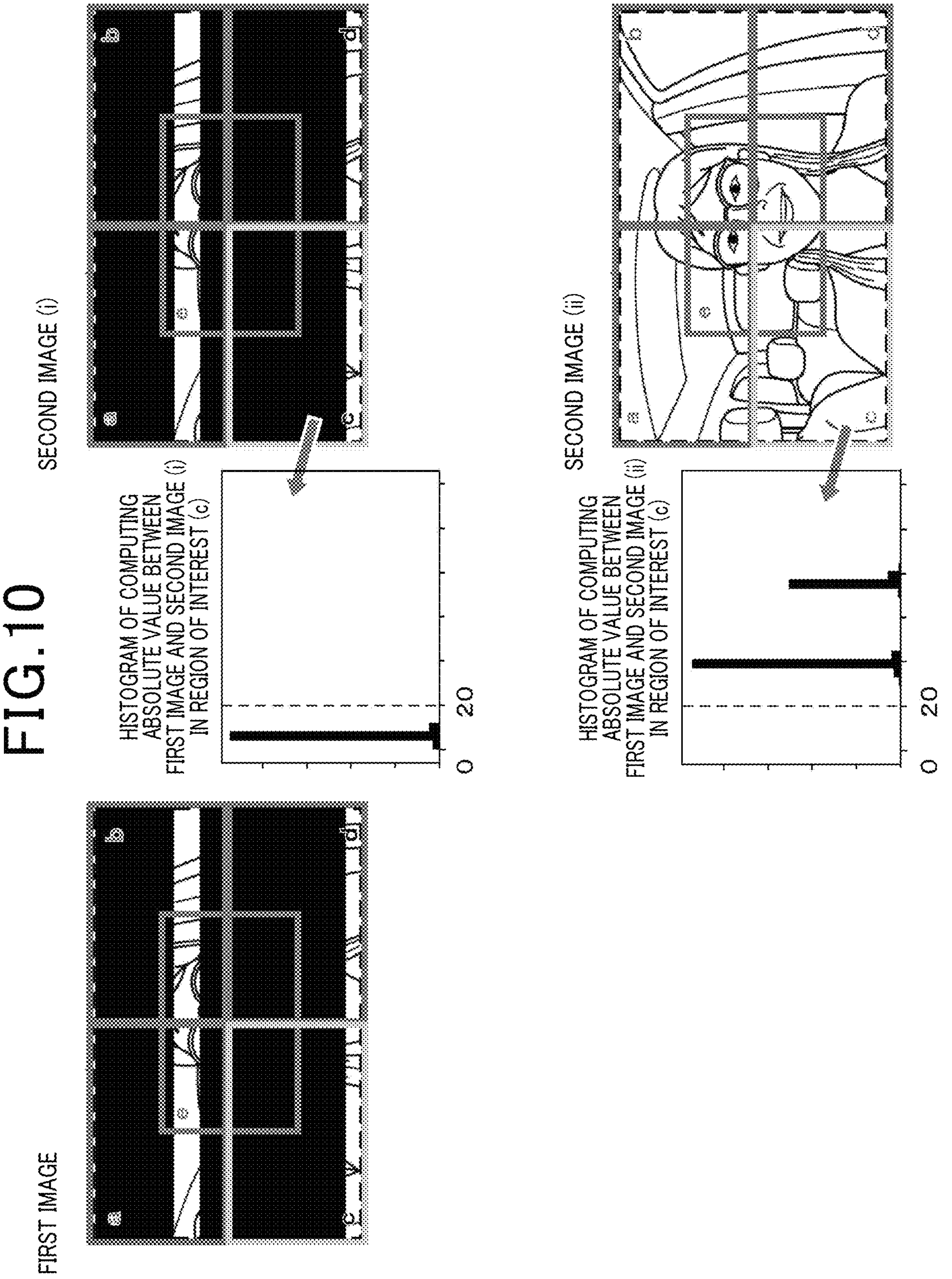
FIG. 10 shows a schematic diagram of another example of a similarity/dissimilarity calculation method by the similarity determination unit according to the second embodiment.

In addition, another example is shown in FIG. 10. In the present example, the similarity determination unit 175 obtains the absolute value difference image abs (first image-second image) between the first image and the second image, which is not shown in the drawing. In this case, similar to the above, the similarity determination unit 175 divides the first image and the second image into a plurality of regions, in this case five regions from region of interest (a) to region of interest (e). In this case, at least one or all of the plurality of regions may be set partly overlapping each other. The similarity determination unit 175 calculates the luminance histogram of the absolute value difference image abs (first image-second image) in the respective regions (a) to (e). For example, the example shown in FIG. 10 shows an example of a luminance histogram of the absolute difference image abs (first image-second image) in the region of interest (c).

The similarity determination unit 175 determines that the first image and the second image match in the respective areas if the percentage of pixels in the luminance histograms of the absolute value difference images abs (first image-second image) in the respective regions (a) to (e) is included in the absolute value difference values in the predetermined range, and if not, it is determined that the first image and the second image do not match in the respective areas. If the similarity determination unit 175 determines that the first image and the second image match in all regions, it determines that that the first image and the second image are similar. The similarity determination unit 175 determines that that the first image and the second image are not similar if they do not match in at least one corresponding region. The percentage of the number of pixels in a given range can be set in the range of about 85% or more, about 90% or more, or about 95% or more, for example. In the present example, the percentage of pixels in the predetermined range is set to about 95% or more. In addition, the predetermined range of absolute difference values can be set in the range of 0 to about 30, 0 to about 25, or 0 to about 20, for example. In the present example, the predetermined range of absolute difference values is set in the range of 0 to 20.

For example, the luminance histogram in the region of interest (c) of the absolute value difference image abs (first image-second image (i)) between the first image and the second image (i) shown in FIG. 10 contains 100% of the number of pixels within the range of absolute value difference values 0 to 20. In this case, the similarity determination unit 175 determines that the first image and the second image (i) are similar with respect to the region of interest (c). If the luminance histograms of the remaining region of interests (a), (b), (d), and (e) are also in the range of absolute difference values 0 to 20, respectively, the similarity determination unit 175 determines that the first image and the second image (i) are similar. On the other hand, the luminance histogram in the region of interest (c) of the absolute value difference image abs (first image-second image (ii)) between the first image and the second image (ii) does not contain 100% of pixels within the absolute value difference value 0-20. The similarity determination unit 175 determines that the first image and the second image (ii) are not similar with respect to the region of interest (c). In addition, the similarity determination unit 175 determines that the first image is not similar to the second image (ii).

It can be estimated that there is no change in the non-temporary malfunction state in the first image and the second image if the similarity determination unit 175 determines that the first image and the second image are similar. In other words, if the first image and the second image are similar, it can be estimated that if the non-temporary malfunction state existed when the first image was captured, i.e., when the IG was turned off last time, it will continue to exist when the second image is captured, i.e., when the ECU power supply unit 111 is turned on this time.

The provisional determination unit 172 determines the current non-temporary malfunction state of the camera system based on the malfunction information at the last IG-OFF and the similarity/dissimilarity determined by the similarity determination unit 175. In this case, the start-up determination unit 17 acquires the second image when the malfunction information at the previous IG-OFF indicates the non-temporary malfunction state present and determines whether the first image and the second image are similar or dissimilar.

(Flowchart at IG-OFF)

Figure 11:
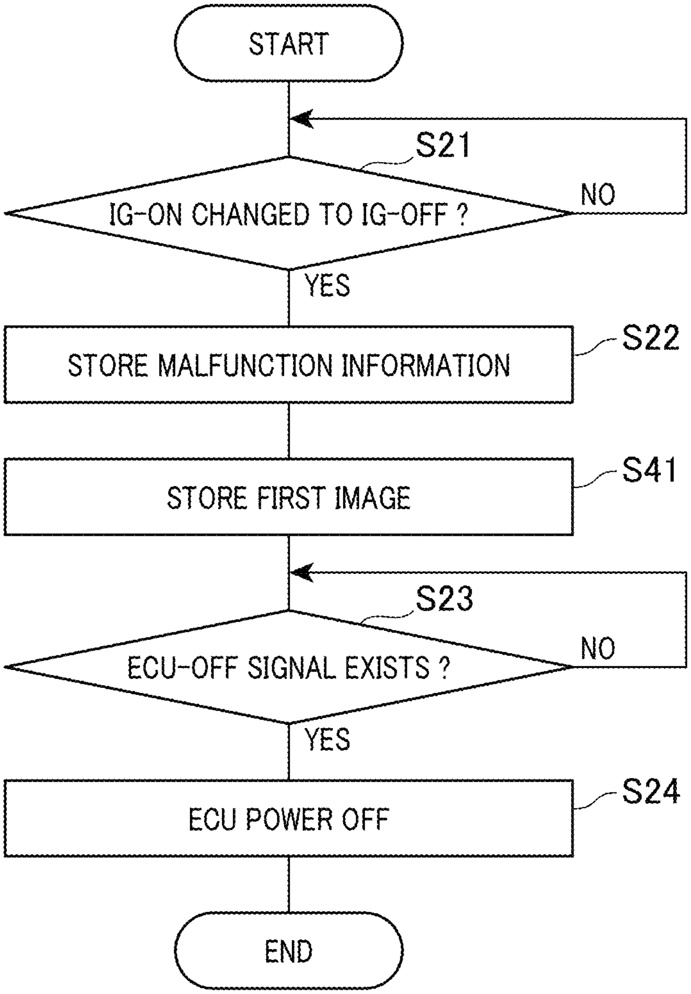
FIG. 11 shows an example of a flowchart showing a process when the notification device goes from an IG-ON state to an IG-OFF state according to the second embodiment.

Referring to the flowchart shown in FIG. 11, a process performed by the notification device 10 when the IG button 202 is operated to change the IG state from the IG-ON state to the IG-OFF state will be described. The following is an explanation of the differences from the process in the first embodiment shown in FIG. 6.

After step S22, the notification device 10 advances the process to step S41. In step S41, the notification device 10 stores the first image in the non-volatile memory 12 as the storage area. As a result, the storage area stores the malfunction state immediately before the change from the IG-ON state to the IG-OFF state and the image by the camera 20 in a queryable manner. After step S41, the notification device 10 advances the process to step S23.

(Flowchart when ECU Power is Turned on)

Figure 12:
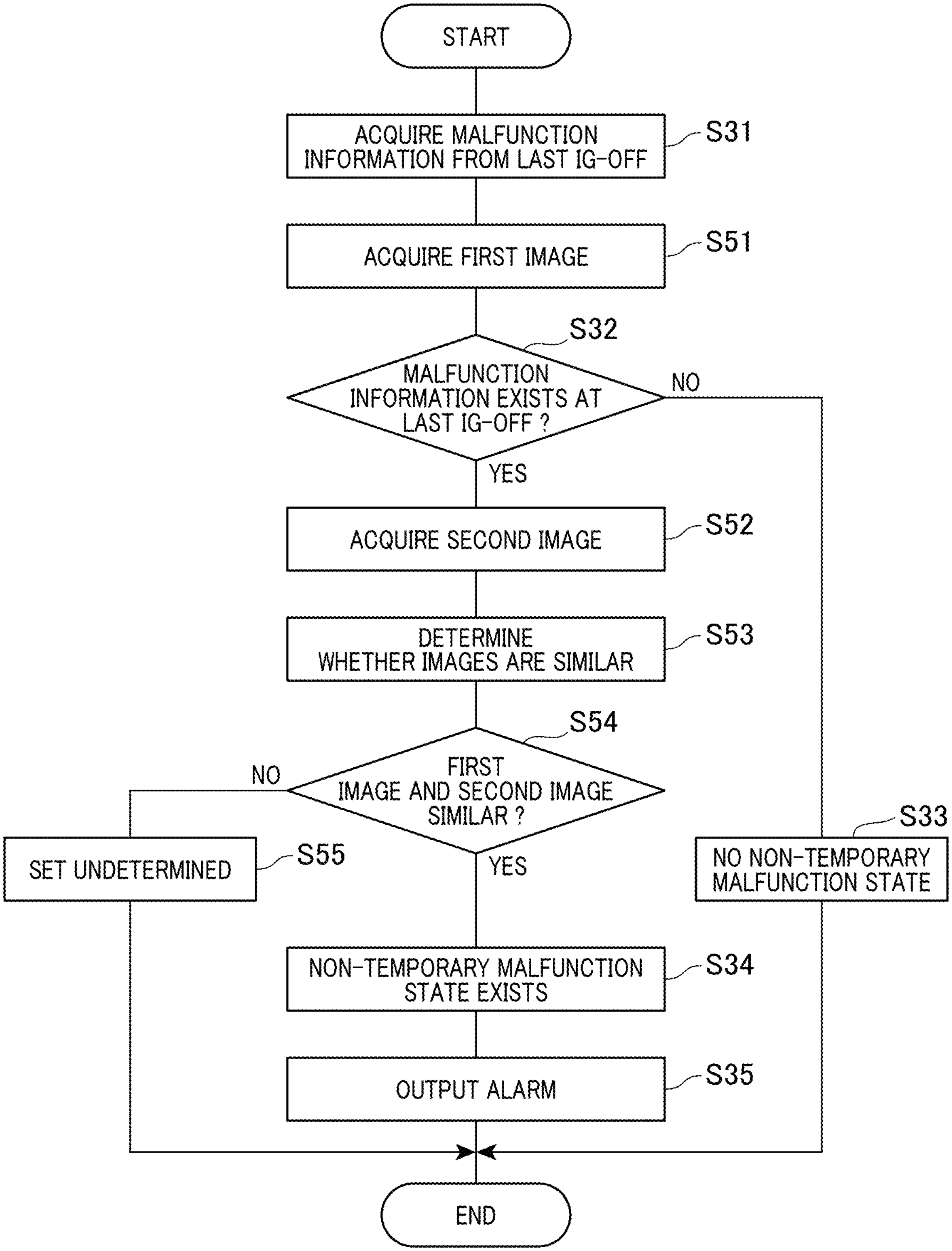
FIG. 12 shows an example of a flowchart showing a processing when the notification device goes from an ECU power OFF state to an ECU power ON state according to the second embodiment.

Referring to the flowchart shown in FIG. 12, the process performed by the notification device 10 when the ECU power supply unit 111 is turned ON from the OFF state is described. Note that the following is an explanation of the differences from the process in the first embodiment shown in FIG. 7.

After step 31, the notification device 10 advances the process to step S51. In step S51, the notification device 10 acquires the first image from the non-volatile memory 12 as the storage area. After step S51, the notification device 10 advances the process to step S32. If the previous information is with a malfunction state (YES in step S32), the notification device 10 advances the process to step S52. In step S52, the notification device 10 acquires a second image from the camera 20 via the image acquisition unit 13.

In step S53, the notification device 10 determines whether the first image and the second image are similar. If it is determined that the two are not similar (NO in step S54), the notification device 10 advances the process to step S55. In step S55, the notification device 10 sets the current non-temporary malfunction state of the camera system to “undetermined”. In other words, even if the malfunction information at the last power-off is present, if the first image and the second image are not similar, the notification device 10 does not determine the non-temporary malfunction state as present, but rather as undetermined, because there may be a change in the non-temporary malfunction state.

If the first image and the second image are determined to be similar (YES in step S54), the notification device 10 advances the process to step S34. In other words, if the previous malfunction information is present and the first image and the second image are similar, there is a very high probability that the non-temporary malfunction state is still present. Therefore, the notification device 10 provisionally determines the current non-temporary malfunction state as present.

According to the present embodiment described above, the memory processing unit 16 stores the first image, which is the image acquired by the image acquisition unit 13 before the ignition of the vehicle is turned off from the on state, in the non-volatile memory 12 as the storage area. The image acquisition unit 13 acquires from the camera 20 the second image, which is the image taken after the ECU 11 as the vehicle control device is turned on from the power-off state. The start-up determination unit 17 includes the first image acquisition processing unit 173 that acquires the first image from the non-volatile memory 12 as the storage area, the second image acquisition processing unit 174 that acquires the second image from the image acquisition unit 13, and the similarity determination unit 175 that compares the first image and the second image to determine whether they are similar. The provisional determination unit 172 determines that the non-temporary malfunction state is present when the malfunction information obtained by the previous information acquisition unit 171 indicates the non-temporary malfunction state present and the similarity determination unit 175 determines that the first image and the second image are similar.

This makes it possible to determine the non-temporary malfunction state at the time of the current ride with a higher probability within a short period of time after the ECU power supply unit 111 is turned on, since the similarity between the image at the time of the previous ride off and the image at the time of the current ride is used to determine the non-temporary malfunction state at the time of the current ride. Thus, driver convenience is improved and vehicle driving safety is enhanced.

It should be noted that in the present embodiment, the notification device 10 does not notify the driver by means of the warning output unit when the non-temporary malfunction state is determined to be "undetermined," but in the other embodiments, the notification device 10 may be configured to notify the driver that the non-temporary malfunction state is undetermined.

Third Embodiment

Figure 13:
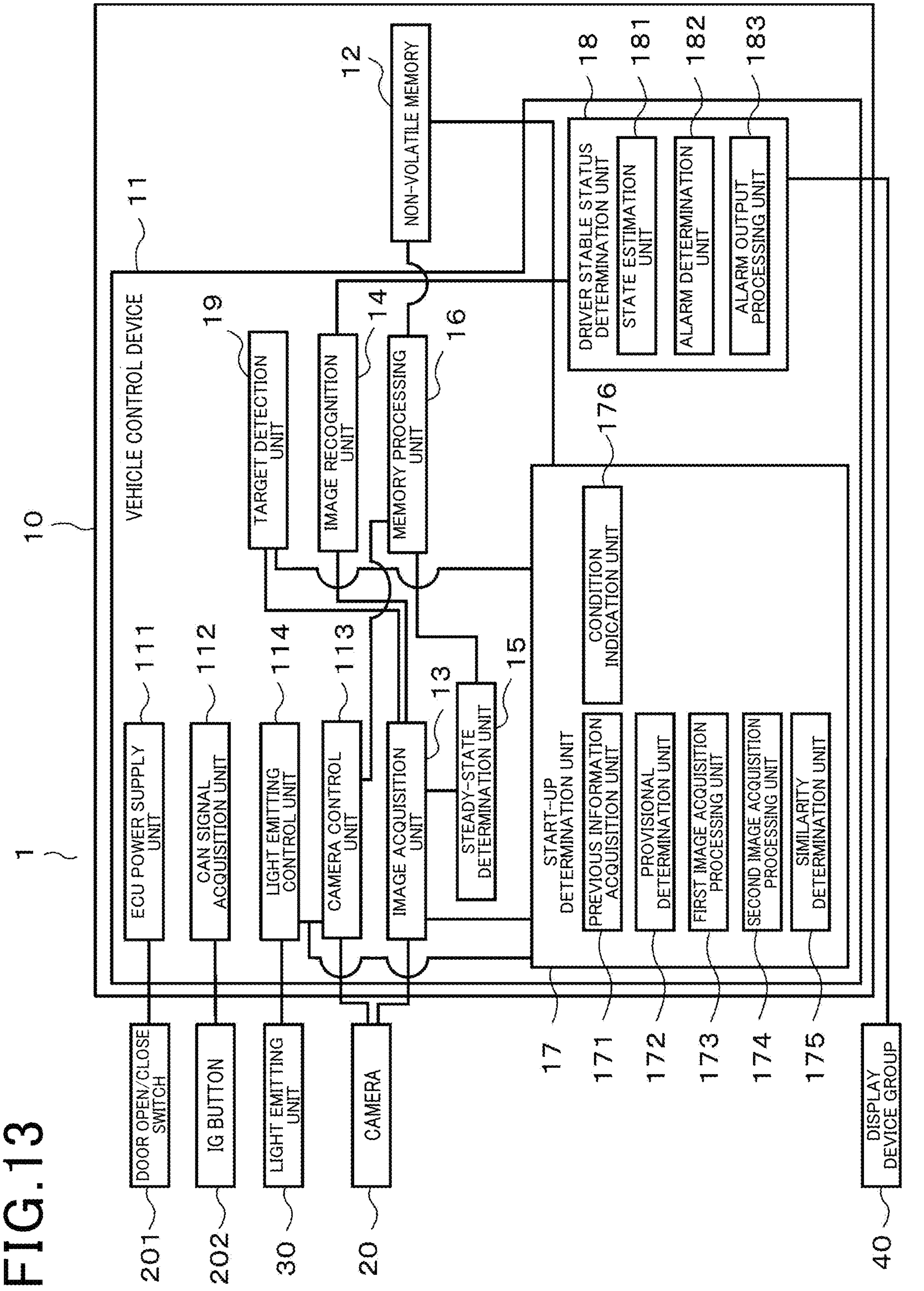
FIG. 13 shows a block diagram outlining an example configuration of a notification device according to a third embodiment.

The third embodiment will be described with reference to FIGS. 13 through 16. In the present embodiment, as shown in FIG. 13, a notification device 10 is equipped with a target detection unit 19. In addition, a start-up determination unit 17 has a condition indication unit 176. In the present embodiment, the condition indication unit 176 sets the imaging conditions for the camera system at the time the ECU power is turned on this time according to the malfunction information stored when the IG-OFF was turned off last time.

The target detection unit 19 has a function of confirming that a target can be recognized in an image acquired by an image acquisition unit 13. The target to be detected (detection target) may be a part of a vehicle, such as a driver, a driver's seat, a headrest of the driver's seat, or a pillar next to the driver's seat. The detection target may be a plurality of items, in which case at least one or more of the pluralities of detection targets should be recognized. The target detection unit 19 is realized software-wise by an ECU executing a program stored in a non-volatile memory 12. Note that the target detection unit 19 may be configured by hardware or by a combination of software and hardware.

As described below, if the target detection unit 19 is unable to detect a target, a non-temporary malfunction state is likely to be present in the camera system. On the other hand, if the target detection unit 19 detects a target, it is likely that the camera system is not experiencing the non-temporary malfunction state.

In the present embodiment, the start-up determination unit 17 determines whether a non-temporary malfunction state exists at startup based on whether the target detection unit 19 has detected a detection target, in addition to the malfunction information obtained by a previous information acquisition unit 171 at the last time the IG-OFF occurred. More specifically, if the malfunction information acquired by the previous information acquisition unit 171 at the time the IG was last turned OFF indicates that there is the non-temporary malfunction state, the target detection unit 19 determines whether the detection target can be detected in the second image.

If a similarity determination unit 175 determines that the first image and the second image are similar and the target detection unit 19 does not detect the detection target, a provisional determination unit 172 determines that the camera system has the non-temporary malfunction state during the period until the normal state after the EUC power is turned on this time. On the other hand, if the similarity determination unit 175 determines that the first image and the second image are not similar and the target detection unit 19 detects the detection target, the provisional determination unit 172 determines that there is no non-temporary malfunction state in the camera system during the period until the normal state after the EUC power is turned on this time. In addition, even if the similarity determination unit 175 determines that the first image and the second image are similar, the provisional determination unit 172 determines that the camera system is not in the non-temporary malfunction state at the time the EUC power is turned on this time, if the target detection unit 19 detects the detection target.

The condition indication unit 176 instructs a camera control unit 113 and/or a light emitting control unit 114 about the imaging conditions by the camera system at the time an ECU power supply unit 111 is turned on this time. In other words, the condition indication unit 176 has a function of instructing the imaging conditions of the camera system for capturing the second image.

In the steady state, the camera control unit 113 and/or light emitting control unit 114 analyze the luminance distribution of the captured image and set the optimal imaging conditions so that the image clearly shows the imaging target. The items that change the imaging conditions are not limited to, but are one or more items selected from a plurality of conditions, including, for example, the exposure time and the gain amount of the camera 20, and the light intensity of the light emitting unit 30. The imaging conditions can be set according to the amount of exposure reaching an image sensor 23 through a lens 21 from the detection target, for example, according to the distance between the lens 21 and the detection target. The closer the distance between the lens 21 and the detection target, the smaller the exposure-receiving amount and gain amount can be set, and the farther the distance between the lens 21 and the detection target, the larger the exposure-receiving amount and gain amount can be set. By increasing the amount of exposure received and the amount of gain, the light charge can be increased, allowing clearer images to be captured even when the vehicle interior is dark.

Figure 14:
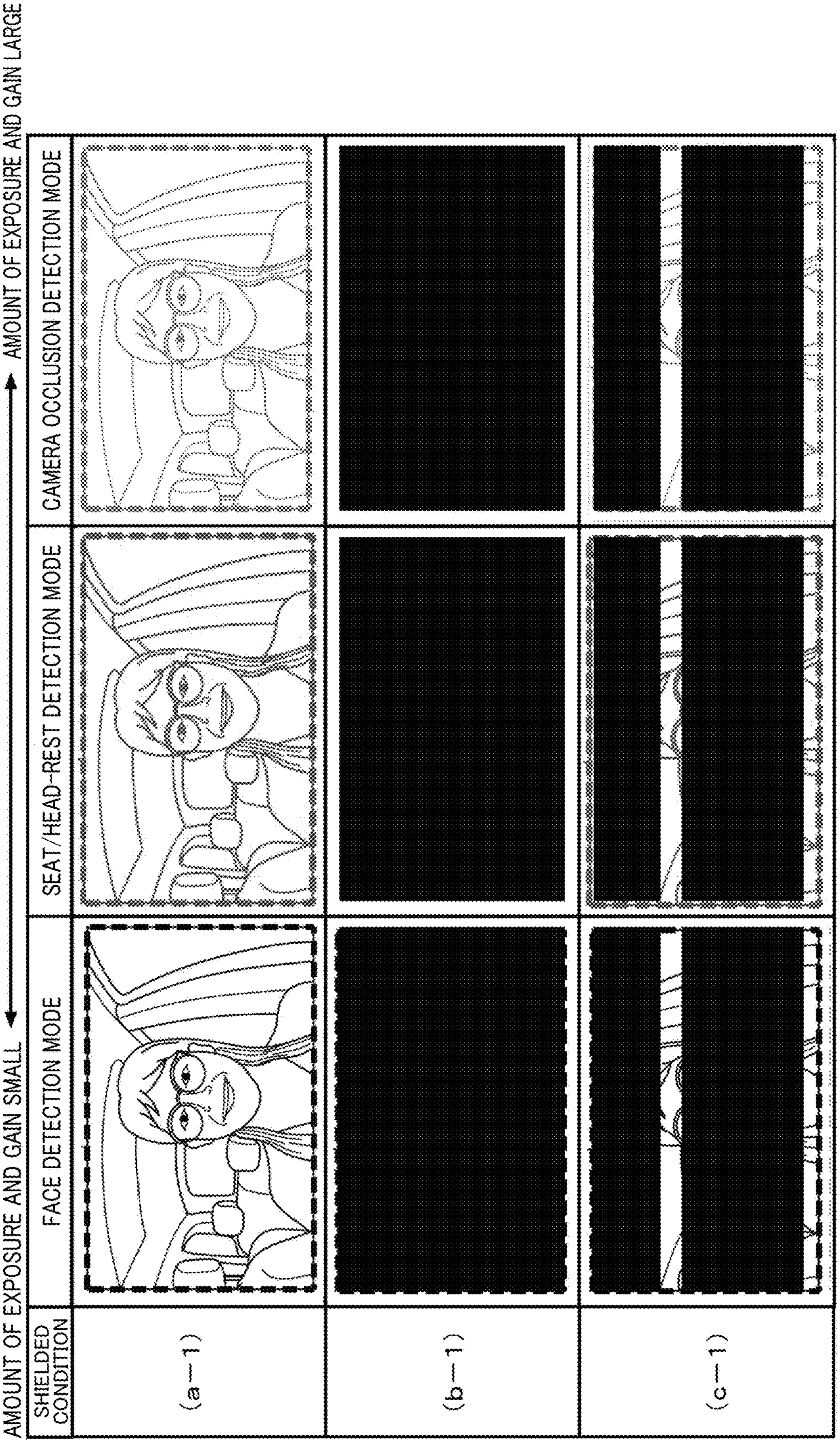
FIG. 14 shows an example of states of images according to an imaging mode of a camera system according to the third embodiment.

The imaging conditions include a plurality of modes that are set according to the amount of exposure received by the image sensor 23 or the amount of gain, or sensitivity, of the image sensor 23. In other words, the camera control unit 113 and/or the light emitting unit 30 can be set to the plurality of multiple modes with different imaging conditions. For example, the imaging conditions can be set to include at least three modes: a face detection mode, a seat/head-rest detection mode, and a camera occlusion detection mode, as shown in FIG. 14. The face detection mode is a mode in which the typical distance between the driver's face and the lens 21 is set in advance, and the amount of exposure received and the amount of gain are set so that the detection target at that distance can be imaged with a favorable degree of shading. The seat/head-rest detection mode is a mode in which the typical distance between the driver's sheet and the lens 21 is set in advance, and the amount of exposure received and the gain amount are set so that the detection target at that distance can be imaged with a favorable degree of shading. Since the driver's seat is assumed to be located farther from the lens 21 than the driver's face, the amount of exposure received in the seat/head-rest detection mode is set larger than the amount of exposure received in the face detection mode, and/or the amount of gain in the seat/head-rest detection mode is set larger than the amount of gain in the face detection mode. The amount of exposure received in the camera occlusion detection mode is set higher than the amount of exposure received in the face detection mode and the seat/head-rest detection mode, and/or the amount of gain in the camera occlusion detection mode is set higher than the amount of gain in the face detection mode and the seat/head-rest detection mode.

In this case, if the camera system is not shielded as shown in FIG. 3 (*a*-1), the image captured in the face detection mode can properly detect the driver's face on the image. In the image captured in the seat/head-rest detection mode, the light intensity is higher than in face detection mode, resulting in a whiter image overall. In the image captured in the camera occlusion detection mode, the driver's face can be detected, although there is a possibility of a slight white-out. In this case, even when the vehicle interior is dark, such as at night, the driver's face and other detectable objects are detected in the image captured in the camera occlusion detection mode.

In addition, as shown in (b-1) of FIG. 3, if there is a shield S at zero distance covering the entire lens 21 of the camera 20, no light will reach the image sensor 23 regardless of whether an image is captured in the face detection mode, the t detection mode, or the camera occlusion detection mode, and therefore all images will be black. In this case, the target detection unit 19 is unable to detect the detection target.

Further, as shown in (c-1) of FIG. 3, if there is a shield S at zero distance that partially covering lens 21 of the camera 20, no light will reach the image sensor 23 for the shielded part when capturing an image in any of the imaging modes, namely, the face detection mode, the seat/head-rest detection mode, or the camera occlusion detection mode, and therefore the part of the image corresponding to the shielded part will appear black. In this case, depending on the size of the shield S, the target detection unit 19 is still unable to detect the target.

In the steady state, the camera control unit 113 and/or the light emitting control unit 114 analyzes the luminance distribution of the captured image, and if the image is dark, the imaging condition is set to the camera occlusion detection mode. If part or all of the image is black even though the image is captured in the camera occlusion detection mode, the steady-state determination unit 15 determines that either one or both of the camera 20 or the light emitting unit 30 is shielded. In other words, when the steady-state determination unit 15 determines that there is malfunction information, the image is captured in the camera occlusion detection mode. Therefore, the first image that is simultaneously stored by the non-volatile memory 12 when the malfunction information indicates that there is non-temporary malfunction information is the one that was captured in the camera occlusion detection mode.

When the IG-ON/OFF button is operated to change the IG-ON state to the IG-OFF state, the memory processing unit 16 stores the imaging conditions set by the camera control unit 113 and the light emitting control unit 114 before the IG-OFF state is stored in the non-volatile memory 12 as a storage area. In other words, the memory processing unit 16 stores the imaging conditions of the first image in addition to the first image when the IG-ON state is changed to the IG-OFF state. An imaging condition set by the camera control unit 113 and the light emitting control unit 114 before the IG-OFF state is referred to as a first imaging condition.

The condition indicating unit 176 sets the imaging conditions of the camera system to at least one or more modes, including the camera occlusion detection mode, if the malfunction information acquired by the previous information acquisition unit 171 when the IG was last turned off indicates that there is a non-temporary malfunction state In other words, if the captured image is a black image or a partially black image, even if the image is captured in at least the camera occlusion detection mode, there is a high probability that a shield is present in the camera system. Therefore, if the previous malfunction information is that there is the non-temporary malfunction and the target detection unit 19 is unable to detect the detection target even when imaging in the camera occlusion detection mode, then the probability that the non-temporary malfunction state continues is even higher.

In the present embodiment, if the malfunction information obtained by the previous information acquisition unit 171 at the time of the last IG-OFF is that there is a non-temporary malfunction state, the condition indication unit 176 sets an imaging condition when the ECU power is turned on this time to the same imaging condition as the first imaging condition. In this case, the condition indication unit 176 sets the imaging condition when the ECU power is turned on this time to a shielded mode. Therefore, it is not necessary to take a new image by the camera system, observe the luminance distribution of the driver's face area, and adjust the imaging conditions, so the second image can be acquired more quickly, i.e., within a shorter period of time after the ECU power supply unit 111 is activated.

In capturing the second image, the condition instructing unit 176 instructs the camera control unit 113 and the light emitting control unit 114 to use the first imaging conditions, i.e., the same conditions as those used for capturing the first image stored in the non-volatile memory 12.

The target detection unit 19 determines whether the detection target can be detected for the second image captured by the imaging conditions set by the condition indication unit 176.

(Flowchart at IG-OFF)

Figure 15:
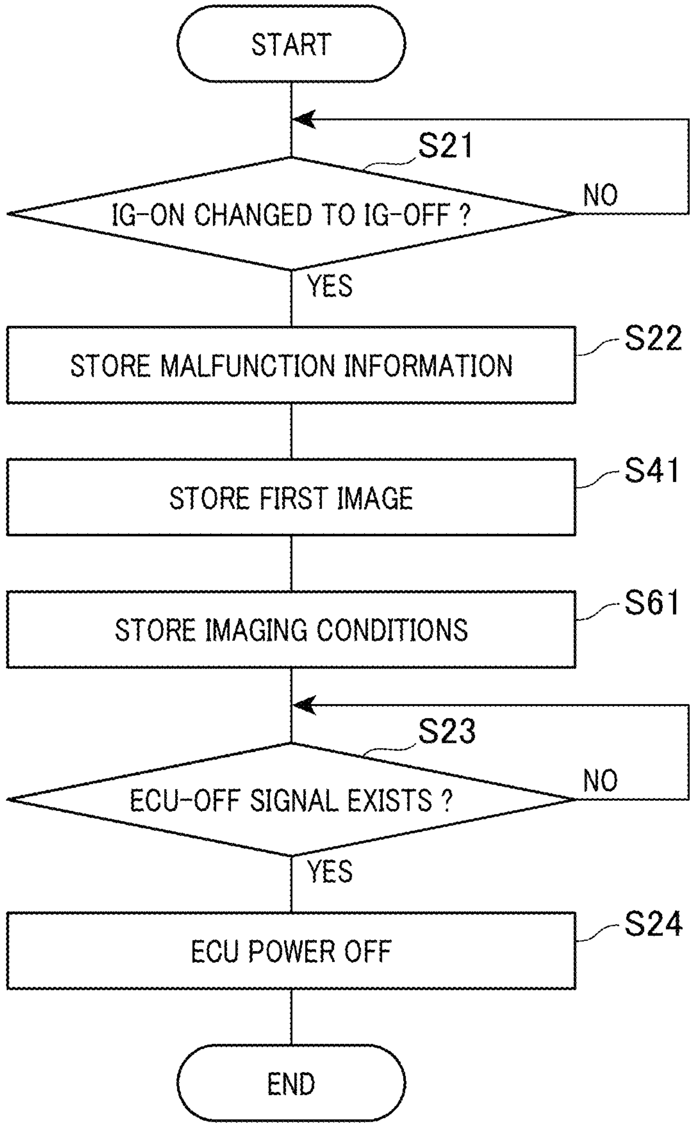
FIG. 15 shows an example of a flowchart showing a process when the notification device goes from an IG-ON state to an IG-OFF state according to the third embodiment.

Referring to the flowchart shown in FIG. 15, the process by the notification device 10 in a case of receiving an operation to the IG-ON/OFF button to change the IG-ON state to the IG-OFF state is described. Note that the following is an explanation of the differences from the process in the first embodiment shown in FIG. 6.

After step S41, the notification device 10 advances the process to step S61. In step S61, the notification device 10 stores in the non-volatile memory 12 as the storage area the imaging conditions, i.e., the first imaging condition, set by the camera control unit 113 and the light emitting control unit 114 before the IG-OFF state. As a result, the non-volatile memory 12 stores the malfunction state immediately before the change from the IG-ON state to the IG-OFF state, the image by the camera 20, and the first imaging condition in referable manner. After step S61, the notification device 10 advances the process to step S23.

(Flowchart when ECU Power is Turned on)

Figure 16:
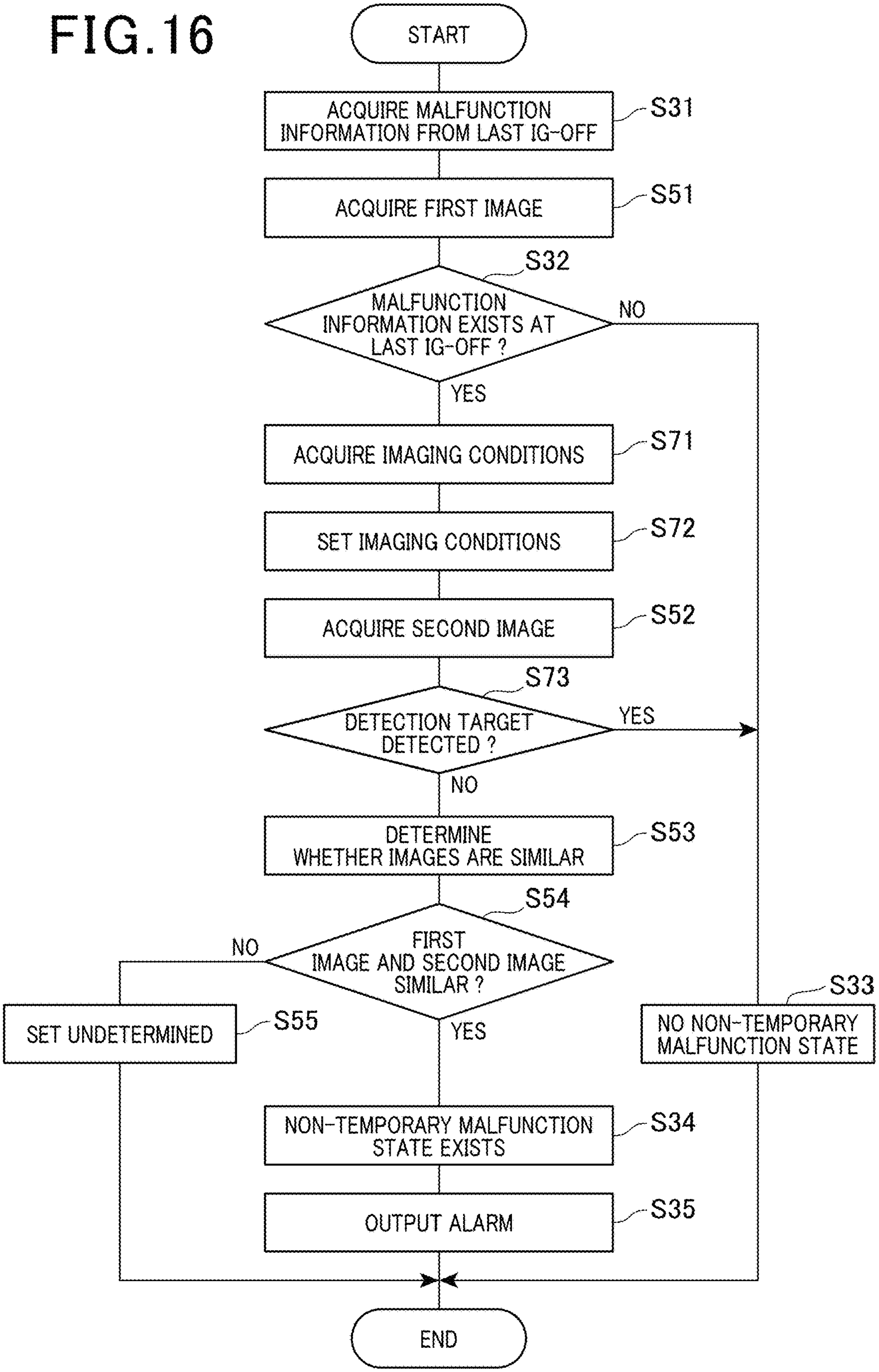
FIG. 16 shows an example of a flowchart showing a processing when the notification device goes from an ECU power OFF state to an ECU power ON state according to the third embodiment.

Referring to the flowchart shown in FIG. 16, the process by the notification device 10 when the ECU power supply unit 111 is turned ON from the OFF state is described. Note that the following is an explanation of the differences from the process in the second embodiment shown in FIG. 10.

If the previous malfunction information stored in the non-volatile memory 12 as the storage area at the time of the last IG-OFF is in the non-temporary malfunction state (YES in step S32), the notification device 10 advances the process to step S71. In step S71, the notification device 10 acquires information on the first imaging condition from the non-volatile memory 12 as the storage area. In step S72, the notification device 10 sets the imaging condition of the camera system to be the same as the first imaging condition. As a result, the second image is captured by the camera occlusion detection mode in which the amount of exposure or gain is increased compared to the imaging conditions when there is no non-temporary malfunction state. After step S72, the notification device 10 advances the process to step S52.

After step S52, the notification device 10 advances the process to step S73. In step S73, the notification device 10 determines whether a detection target is detected in the captured image. If the target is detected (YES in step S73), the notification device 10 advances the process to step S33. In other words, if a detection target is detected, it is highly likely that the non-temporary malfunction state has been resolved, such as the removal of the shield, between the last time the IG-OFF was turned off and the time the ECU power was turned on this time. Therefore, in this case, the start-up determination unit 17 determines that there is no non-temporary malfunction state.

If no target is detected (NO in step S73), the notification device 10 advances the process to step S54. In other words, if the detection target is not detected, there is a high possibility that the non-temporary malfunction state is still continuing because the shield has not been removed, etc., and therefore, the similarity or dissimilarity between the first image and the second image is determined to provisionally determine whether the non-temporary malfunction state exists.

According to the embodiment described above, the notification device 10 is equipped with the target detection unit 19 that detects a target in the vehicle on the second image. The provisional determination unit 172 determines that the non-temporary malfunction state exists if the malfunction information obtained by the previous information acquisition unit 171 indicates that there is the non-temporary malfunction state, and if the first image and the second image are determined to be similar and the target detection unit 19 does not detect a detection target. The provisional determination unit 172 determines that there is no non-temporary malfunction state if the similarity determination unit determines that the first image and the second image are not similar and the target detection unit 19 detects a detection target, even if the malfunction information obtained by the previous information acquisition unit 171 indicates the non-temporary malfunction state is present.

According to this, the accuracy of the case in which the start-up determination unit 17 determines that the non-temporary malfunction state exists can be further improved based on a condition that can be determined in a relatively short period of time, namely, whether the target is detected in the image taken after the ECU power is turned on this time. In addition, when a detection target is detected, it means that the non-temporary malfunction state has been resolved, and the camera system can be used, thus improving user convenience.

The memory processing unit 16 stores the imaging conditions of the first image in the non-volatile memory 12 as the storage area. If the malfunction information obtained by the previous information acquisition unit 171 indicates that there is the non-temporary malfunction state, the start-up determination unit 17 sets imaging conditions of the second image to be the same as those of the first image.

According to this, since the second image after the current ride can be captured under the same imaging conditions as the first image captured before the last ride off, error components due to differences in imaging conditions can be eliminated when comparing the first image and the second image. Further, the time required to acquire the second image can be shortened because there is no need to analyze the luminance distribution of the image again and set optimal imaging conditions when capturing the second image. Therefore, the start-up determination unit 17 can determine whether a non-temporary malfunction state exists in an even shorter period of time.

An imaging condition for the first image when there is a non-temporary malfunction state is an imaging condition in which the light intensity or sensitivity received by the image sensor 23 of the camera 20 is increased compared to the imaging condition when there is no non-temporary malfunction state.

When a non-temporary malfunction state occurs, some or all of the image will be black even if the light intensity or sensitivity received by the image sensor 23 is increased. Therefore, by comparing the first image and the second image captured using the camera occlusion detection mode in which the light intensity and sensitivity received by the image sensor 23 is increased compared to the face detection mode or the seat/head-rest detection mode, the accuracy with which both images are correctly determined to be similar when the non-temporary malfunction state continues can be improved. The accuracy of the determination of the presence or absence of a non-temporary malfunction state by the start-up determination unit 17 is improved.

Fourth Embodiment

A fourth embodiment will be described with reference to FIGS. 17 and 18. In the present embodiment, as in the third embodiment above, a notification device 10 is equipped with a target detection unit 19. In addition, a start-up determination unit 17 has a condition indication unit 176.

If the malfunction information stored in a non-volatile memory 12 at the time of the previous IG-ON state to IG-OFF state indicates that there is a non-temporary malfunction state, and when an ECU power supply unit is turned ON from the OFF state this time, the notification device 10 changes imaging conditions of a camera system, captures images a plurality of times, and obtains a second image captured under a plurality of imaging conditions. In other words, the condition indication unit 176 instructs a camera control unit 113 and/or a light emitting control unit 114 on a plurality of imaging conditions when capturing the second image. The notification device 10 compares a plurality of second images taken under the plurality of imaging conditions with a first image, and makes a similarity determination for each second image and first image. The plurality of imaging conditions are a plurality of conditions set by increasing or decreasing the amount of exposure received by an image sensor 23 or the amount of gain. At least one of the pluralities of imaging conditions is an imaging condition at the time of capturing the first image, i.e., the camera occlusion detection mode. In the present embodiment, the plurality of imaging conditions are three imaging conditions, including the face detection mode, the seat/head-rest detection mode, and the camera occlusion detection mode described above.

As shown in FIG. 14, when the shield state is at zero distance as in (b-1), the captured image will be a black image even if the light intensity or gain is increased or decreased under the plurality of imaging conditions. On the other hand, if the image is black simply because it is nighttime when the image is taken or the ambient light is dark, the detection target may be captured by imaging under imaging conditions that increase the amount of exposure or gain. Therefore, by comparing the second image taken under the plurality of imaging conditions with the first image, the accuracy of the determination that the non-temporary malfunction state exists can be improved.

The similarity determination unit 175 compares the plurality of second images and the first image, respectively, to determine whether they are similar. If there is the non-temporary malfunction state when the IG-OFF state is changed from the previous IG-ON state and all of the plurality of second images are similar to the first image, it is determined that the non-temporary malfunction state is likely to continue at the present time. On the other hand, if not all of the plurality of second images are similar to the first image, it is possible that the non-temporary malfunction state is not currently ongoing.

The provisional determination unit 172 provisionally determines the non-temporary malfunction state of the camera system when the ECU power supply unit 111 is turned on this time based on the similarity/dissimilarity between the plurality of second images and the first image determined by the similarity determination unit.

(Flowchart when ECU Power is Turned on)

Figure 17:
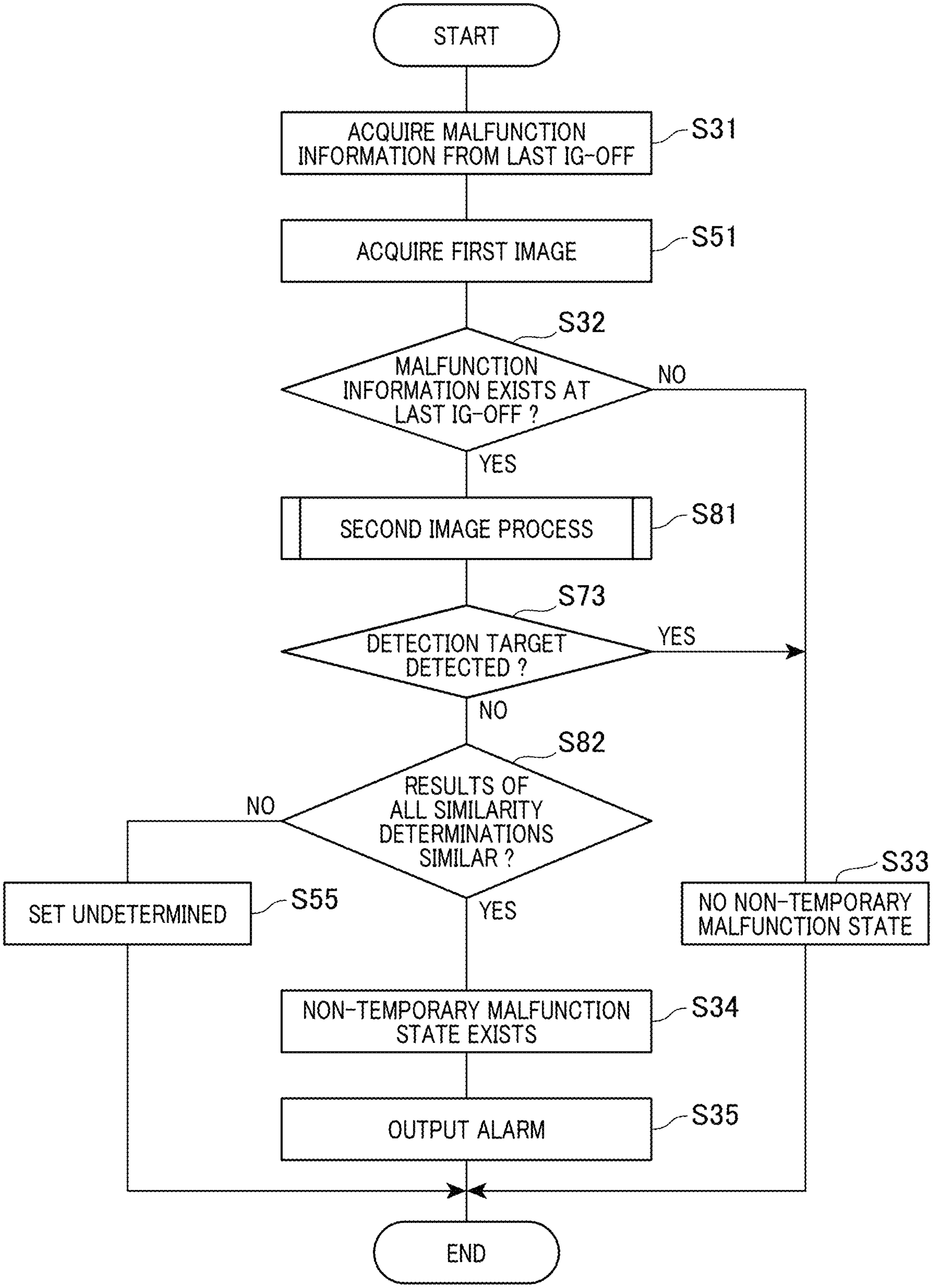
FIG. 17 shows an example of a flowchart (Part 1) showing a process of a notification device when an ECU power is turned ON state from an ECU power OFF state of a notification device according to a fourth embodiment.
Figure 18:
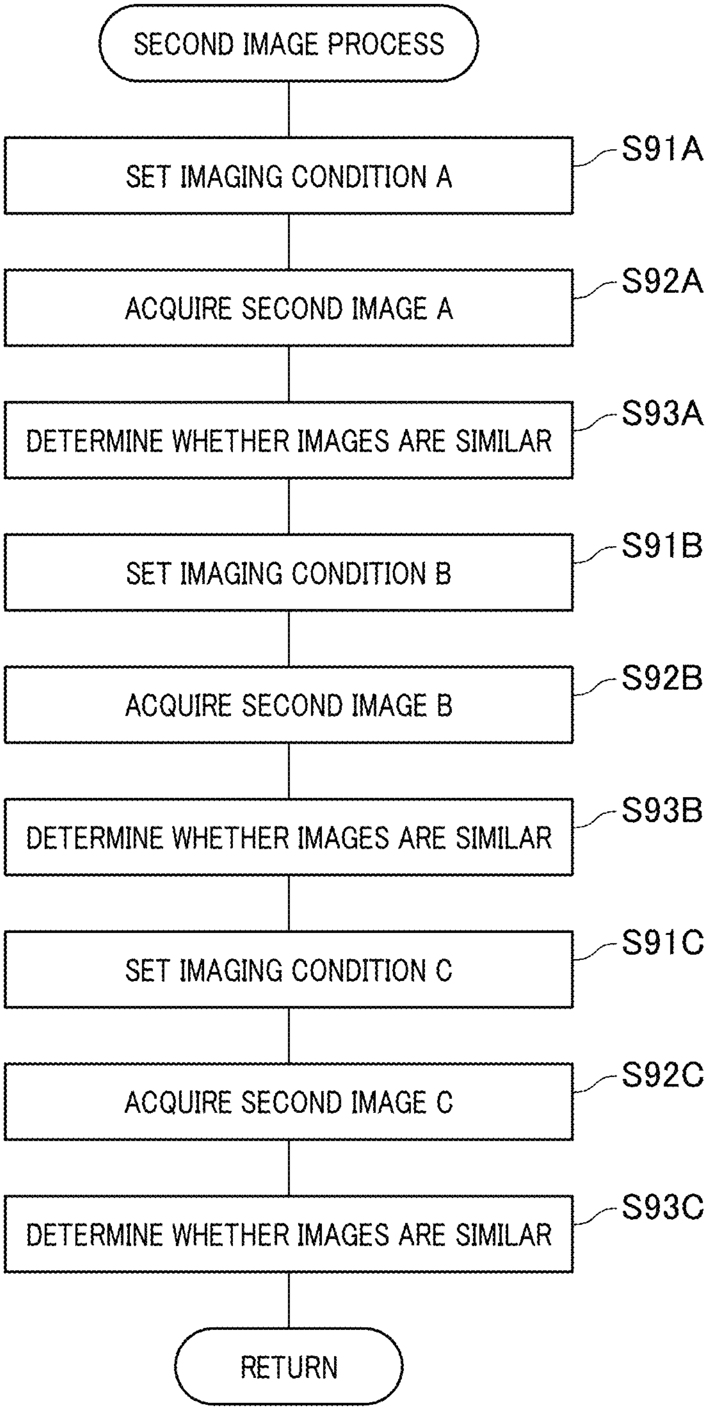
FIG. 18 shows an example of a flowchart (Part 2) showing a process of the notification device when the ECU power is turned ON state from the ECU power OFF state of the notification device according to the fourth embodiment.

Referring to the flowcharts shown in FIGS. 17 and 18, the process by the notification device 10 when the ECU power is turned ON from the OFF state is described. Note that the following is an explanation of the differences from the process in the second embodiment shown in FIG. 13.

If the malfunction information stored in the non-volatile memory 12 as the storage area at the time of the last IG-OFF is non-temporarily malfunctioning (YES in step S32), the notification device 10 advances the process to step S81. In step S81, the notification device 10 performs a second image process. The second image process is a process that acquires a plurality of second images taken under a plurality of imaging conditions and determines whether each second image is similar to the first image.

When the second image process is started as shown in the flowchart in FIG. 18, the notification device 10 sets a first imaging condition, or an imaging condition A, in step S91A.

The notification device 10 acquires a second image A captured by the imaging condition A in step S92A. In step S93A, the notification device 10 calculates whether the second image A is similar to the first image. For example, the imaging condition A is the face detection mode. The notification device 10 sets a second imaging condition, or an imaging condition B, in step S91B. The imaging condition B is a different imaging condition from the imaging condition A. The notification device 10 acquires a second image B captured by the imaging condition B in step S92B. In step S93B, the notification device 10 calculates whether the second image B is similar to the first image. For example, imaging condition B is the seat/head-rest detection mode. The notification device 10 sets a third imaging condition, or an imaging condition C, in step S91C. The imaging condition C is a different imaging condition from the imaging conditions A and B. The notification device 10 acquires a second image C captured by the imaging condition C in step S92C. In step S93C, the notification device 10 calculates whether the second image C is similar to the first image. For example, the imaging condition C is the camera occlusion detection mode.

Note that in the present embodiment, the number of imaging conditions in the second image process is set to three, but is not limited to this. The imaging conditions in the second image process may be two or more imaging conditions, including at least the camera occlusion detection mode, and may be two imaging conditions or four or more imaging conditions. In this case, notification device 10 repeats the process from step S91X to S93X (X is any alphabet) for the number of imaging conditions.

In this way, in the second image process, the second images captured by the plurality of imaging conditions, including at least the camera occlusion detection mode, are acquired, and it is determined whether the respective second image and the first image are similar. When all processes of the second image processing are completed (return), the notification device 10 advances the process to step S73 of the flowchart in FIG. 17.

If no target is detected (NO in step S73), the notification device 10 advances the process to step S82. In step S82, the notification device 10 determines whether the results of all similarity determinations in the second image process are similar. If the results of all similarity determinations are similar (YES in step S82), the notification device 10 advances the process to step S34. If the results of all similarity determinations are not similar, i.e., if some or all of the similarity determinations are dissimilar (NO in step S82), the notification device 10 advances the process to step S55. In other words, if any one of the second images captured under the plurality of imaging conditions is not similar, there is a possibility that the state of the camera system has changed from the state before the previous ride off, so it is not determined that there is a non-temporary malfunction, and the non-temporary malfunction state is left undetermined.

According to the present embodiment described above, the similarity determination unit 175 compares each of the plurality of second images captured under the plurality of imaging conditions set by increasing or decreasing the gain or amount of exposure received by the image sensor 23 of the camera 20 with the first image to determine whether it is similar to the first image when the malfunction information obtained by the previous information acquisition unit 171 indicates that the non-temporary malfunction state exists.

If the camera 20 or the light emitting unit 30 is in the non-temporary malfunction state, such as being shielded at zero distance, the second images will be all black images, regardless of light intensity or sensitivity. By using these characteristics to determine the similarity between the first image and the second image captured under the plurality of imaging conditions, the accuracy of similarity determination can be improved when the non-temporary malfunction occur. Therefore, misjudgment of non-temporary malfunctions at startup can be suppressed from occurring, and driver convenience and safety are improved.

The provisional determination unit determines that there is the non-temporary malfunction state if the similarity determination unit 175 determines that the plurality of second images and first image captured under the plurality of imaging conditions, respectively, are all similar.

If the similarity or dissimilarity between the first image and the second images differs depending on the imaging conditions of the second image, it is likely that at least at the time of this startup, the image is not in the non-temporary malfunction state due to zero-distance shield. Therefore, by determining that the non-temporary malfunction state exists when images are similar under all of the plurality of imaging conditions, erroneous determinations due to differences in imaging conditions can be suppressed from occurring.

Although the present disclosure has been described in accordance with examples, it is understood that the present disclosure is not limited to the examples or structures. The present disclosure also encompasses various variants and variations within the scope of equality. In addition, various combinations and forms, as well as other combinations and forms that include only one element, more or less, thereof, also fall within the scope and idea of the present disclosure.

A control unit and methods described in the present disclosure may be realized by a dedicated computer provided by configuring a processor and memory programmed to perform one or more functions embodied by the computer program. Alternatively, the control unit and methods described in the present disclosure may be realized by a dedicated computer provided by configuring the processor with one or more dedicated hardware logic circuits. Alternatively, the control unit and methods described in the present disclosure may be realized by one or more dedicated computers composed of a processor and memory programmed to perform one or more functions, in combination with a processor composed of one or more hardware logic circuits. In addition, the computer program may also be stored in a computer-readable, non-transitory tangible storage media as instructions to be executed by a computer.

In addition to the inventions described in the claims, the present disclosure also includes the following inventions.

[1] A notification device (10) includes:

an image acquisition unit (13) that acquires images from a camera (20) that captures images of an interior of a vehicle, a steady-state determination unit (15) that determines whether a non-temporary malfunction state occurs in a camera system including the camera in a steady-state condition based on the images acquired by the image acquisition unit, a memory processing unit (16) that stores, in a storage area (12), malfunction information that is information regarding the non-temporary malfunction state determined by the steady-state determination unit in response to an ignition of the vehicle being changed from an on state to an off state, a start-up determination unit (17) that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit (183) that outputs an alarm to notify the driver when the steady-state determination unit or the start-up determination unit determines that the camera system is in the non-temporary malfunction state, wherein the start-up determination unit includes a previous information acquisition unit (171) that acquires the malfunction information stored in the storage area when a control unit (11) of the vehicle was turned off from a previous power-on state, and a provisional determination unit (172) that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

[2] The notification device according to [1], wherein the memory processing unit stores a first image, which is an image acquired by the image acquisition unit before the ignition of the vehicle is turned off from the on state, in the storage area, the image acquisition unit acquires from the camera a second image, which is an image captured after the control unit is turned on from the power-off state, the start-up determination unit includes a first image acquisition processing unit (173) that acquires the first image from the storage area, a second image acquisition processing unit (174) that acquires the second image from the image acquisition unit, and a similarity determination unit (175) that compares the first image and the second image to determine whether the first image and the second image are similar, and the provisional determination unit determines that the non-temporary malfunction state exists when the malfunction information obtained by the previous information acquisition unit indicates that the non-temporary malfunction state exists and the similarity determination unit determines that the first image and the second image are similar.

[3] The notification device according to [2], wherein the notification device includes a target detection unit (19) that detects a detection target in the vehicle on the second image, the provisional determination unit determines that the non-temporal malfunction exists when the malfunction information obtained by the previous information acquisition unit indicates that the non-temporary malfunction state exists, and when the similarity determination unit determines that the first image and the second image are similar and the target detection unit does not detect the target, and the provisional determination unit determines that the non-temporary malfunction state does not exists when the similarity determination unit determines that the first image is not similar to the second image and the target detection unit detects the detected target, even if the malfunction information obtained by the previous information acquisition unit indicates that the non-temporary malfunction state exists.

[4] The notification device according to any one of [1] to [3], wherein the memory processing unit stores an imaging condition of the first image in the storage area, the start-up determination unit sets an imaging condition of the second image to be the same as the imaging condition of the first image when the malfunction information obtained by the previous information acquisition unit indicates that the non-temporary malfunction state exists.

[5] The notification device according to any one of [1] to [4], wherein the imaging condition of the first image when the non-temporary malfunction state exists is an imaging condition in which the light intensity or sensitivity received by an image sensor of the camera is increased compared to an imaging condition when the non-temporary malfunction state does not exist.

[6] The notification device according to any one of [1] to [3], wherein the similarity determination unit compares, when the previous information obtained by the previous information acquisition unit indicates that the non-temporary malfunction exists, each of the plurality of second images captured under the plurality of imaging conditions set by increasing or decreasing the gain or amount of exposure received by the image sensor of the camera with the first image to determine whether the second images and the first image are similar or dissimilar.

[7] The notification device according to any one of [1] to [3] or [6], wherein

The provisional determination unit determines that the non-temporary malfunction state exists when the similarity determination unit determines that the plurality of second images and the first images captured under the plurality of imaging conditions respectively are all similar.

[8] A notification system includes:

an image acquisition unit (13) that acquires images from a camera (20) that captures images of an interior of a vehicle, a steady-state determination unit (15) that determines whether a non-temporary malfunction state occurs in a camera system including the camera in a steady-state condition based on the images acquired by the image acquisition unit, a storage area (12) that stores malfunction information, which is information about a non-temporary malfunction state occurring in the camera system as determined by the steady-state determination unit in a manner that is not erased when the power of a control unit of the vehicle is turned off, a memory processing unit (16) that stores the malfunction information in the storage area in response to the vehicle's ignition being turned off from an on state, a start-up determination unit (17) that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit (183) that notifies a driver when the steady-state determination unit or the start-up determination unit determines that the non-temporary malfunction state exists, wherein the start-up determination unit includes a previous information acquisition unit (171) that acquires the malfunction information stored in the storage area when the control unit was turned off from a previous power-on state, and a provisional determination unit (172) that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

What is claimed is:

1. A notification device comprising:

an image acquisition unit that acquires images from a camera that captures images of an interior of a vehicle, a steady-state determination unit that determines whether a non-temporary malfunction state occurs in a camera system including the camera in a steady-state condition based on the images acquired by the image acquisition unit, a memory processing unit that stores, in a storage area, malfunction information that is information regarding the non-temporary malfunction state determined by the steady-state determination unit in response to an ignition of the vehicle being changed from an on state to an off state, a start-up determination unit that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit that outputs an alarm to notify the driver when the steady-state determination unit or the start-up determination unit determines that the camera system is in the non-temporary malfunction state, wherein the start-up determination unit includes a previous information acquisition unit that acquires the malfunction information stored in the storage area when a control unit of the vehicle was turned off from a previous power-on state, and a provisional determination unit that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

2. The notification device according to claim 1, wherein the memory processing unit stores a first image, which is an image acquired by the image acquisition unit before the ignition of the vehicle is turned off from the on state, in the storage area, the image acquisition unit acquires from the camera a second image, which is an image captured after the control unit is turned on from the power-off state, the start-up determination unit includes a first image acquisition processing unit that acquires the first image from the storage area, a second image acquisition processing unit that acquires the second image from the image acquisition unit, and a similarity determination unit that compares the first image and the second image to determine whether the first image and the second image are similar, and the provisional determination unit determines that the non-temporary malfunction state exists when the malfunction information obtained by the previous information acquisition unit indicates that the non-temporary malfunction state exists and the similarity determination unit determines that the first image and the second image are similar.

3. The notification device according to claim 2, wherein the notification device includes a target detection unit that detects a detection target in the vehicle on the second image, the provisional determination unit determines that the non-temporal malfunction exists when the malfunction information obtained by the previous information acquisition unit indicates that the non-temporary malfunction state exists, and when the similarity determination unit determines that the first image and the second image are similar and the target detection unit does not detect the target, and the provisional determination unit determines that the non-temporary malfunction state does not exists when the similarity determination unit determines that the first image is not similar to the second image and the target detection unit detects the detected target, even if the malfunction information obtained by the previous information acquisition unit indicates that the non-temporary malfunction state exists.

4. The notification device according to claim 2, wherein the memory processing unit stores an imaging condition of the first image in the storage area, the start-up determination unit sets an imaging condition of the second image to be the same as the imaging condition of the first image when the malfunction information obtained by the previous information acquisition unit indicates that the non-temporary malfunction state exists.

5. The notification device according to claim 4, wherein the imaging condition of the first image when the non-temporary malfunction state exists is an imaging condition in which the light intensity or sensitivity received by an image sensor of the camera is increased compared to an imaging condition when the non-temporary malfunction state does not exist.

6. The notification device according to claim 2, wherein the similarity determination unit compares, when the previous information obtained by the previous information acquisition unit indicates that the non-temporary malfunction exists, each of the plurality of second images captured under the plurality of imaging conditions set by increasing or decreasing the gain or amount of exposure received by the image sensor of the camera with the first image to determine whether the second images and the first image are similar or dissimilar.

7. The notification device according to claim 6, wherein

The provisional determination unit determines that the non-temporary malfunction state exists when the similarity determination unit determines that the plurality of second images and the first images captured under the plurality of imaging conditions respectively are all similar.

8. A notification system comprising:

an image acquisition unit that acquires images from a camera that captures images of an interior of a vehicle, a steady-state determination unit that determines whether a non-temporary malfunction state occurs in a camera system including the camera in a steady-state condition based on the images acquired by the image acquisition unit, a storage area that stores malfunction information, which is information about a non-temporary malfunction state occurring in the camera system as determined by the steady-state determination unit in a manner that is not erased when the power of a control unit of the vehicle is turned off, a memory processing unit that stores the malfunction information in the storage area in response to the vehicle's ignition being turned off from an on state, a start-up determination unit that determines whether the non-temporary malfunction state is occurring in the camera system during the period of time from when the ignition is changed to the on state from the off state until the steady-state determination unit is able to determine the occurrence of the non-temporary malfunction state, and an alarm output processing unit that notifies a driver when the steady-state determination unit or the start-up determination unit determines that the non-temporary malfunction state exists, wherein the start-up determination unit includes a previous information acquisition unit that acquires the malfunction information stored in the storage area when the control unit was turned off from a previous power-on state, and a provisional determination unit that determines that the non-temporary malfunction state exists if the previous information obtained by the previous information acquisition unit indicates that the non-temporary malfunction state exists, and determines that the non-temporary malfunction state does not exist if the previous information obtained by the previous information acquisition unit indicates that the non-temporary malfunction state does not exist.

* * * * *